United States Patent [19]

Sugano et al.

[11] Patent Number: 5,346,925
[45] Date of Patent: Sep. 13, 1994

[54] METHOD FOR PRODUCING α-OLEFIN POLYMERS

[75] Inventors: Toshihiko Sugano; Takashi Fujita; Kazuyo Kuwaba, all of Yokkaichi, Japan

[73] Assignee: Mitsubishi Petrochemical Company Limited, Tokyo, Japan

[21] Appl. No.: 149,911

[22] Filed: Nov. 10, 1993

[30] Foreign Application Priority Data

Nov. 10, 1992 [JP] Japan .................................. 4-300138
Nov. 11, 1992 [JP] Japan .................................. 4-301146
Dec. 9, 1992 [JP] Japan .................................. 4-329509

[51] Int. Cl.$^5$ .............................................. C08J 9/40
[52] U.S. Cl. ...................................... 521/54; 521/134; 521/142; 521/143; 525/322; 525/323; 526/160; 526/904
[58] Field of Search ................. 521/54, 143, 134, 142; 525/322, 323; 526/160, 904

[56] References Cited

U.S. PATENT DOCUMENTS

| | | | |
|---|---|---|---|
| 4,455,405 | 6/1984 | Jaggard et al. | 525/323 |
| 5,162,442 | 11/1992 | Matsuura et al. | 525/323 |
| 5,162,443 | 11/1992 | Matsuura et al. | 525/323 |

*Primary Examiner*—Morton Foelak

*Attorney, Agent, or Firm*—Oblon, Spivak, McClelland, Maier & Neustadt

[57] ABSTRACT

A method for preparing an α-olefin polymer in which an α-olefin is polymerized in the presence of a catalyst, characterized in that the catalyst is a solid obtained by making the following components (ii) and (iii) be supported in the component (i):

Component (i): an organic porous polymer having an average particle diameter of 5 to 1,000 μm, in which the total pore volume of all pores whose diameter is 0.006 to 10 μm is 0.3 cc/g or more, and the total pore volume of all pores whose diameter is 0.05 to 2 μm is 50% or more of the total pore volume of all pores whose diameter is 0.006 to 10 μm;

Component (ii) a compound having the structure

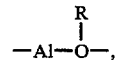

in which R is a hydrocarbon group having 1 to 10 carbon atoms; and Component (iii) a compound of a transition metal which belongs to one of the Groups IVB to VIB in the Periodic Table, having at least one conjugated 5-membered cyclic ligand.

21 Claims, No Drawings

METHOD FOR PRODUCING α-OLEFIN POLYMERS

BACKGROUND OF THE INVENTION

1. Field of the Invention

The present invention relates to a method for preparing α-olefin polymers. More specifically, the present invention is to provide a method by which the production in a high yield of particulate polymers having good particle properties is made possible when it is applied to polymerization of an α-olefin, and, in particular, a method by which the production of particulate polymers that are free from the problem of adhesion of particles is made possible even when it is employed for producing polymers having a high rubber content.

2. Related Art

In recent years, highly active catalysts useful for the polymerization of olefins, which are a combination of a zirconocene compound and an alumoxane, have been proposed (Japanese Laid-Open Patent Publications Nos. 19309/1983 and 35007/1985). Further, it has also been proposed to design the structure of the ligand of the catalysts of the above type to make the preparation of various stereoregular polymers possible (Japanese Laid-Open Patent Publications Nos. 130314/1986, 295607/1988, 301704/1989 and 41303/1990). According to this proposal, polymers having high activity and a narrow molecular-weight distribution may be prepared. On the contrary, the catalysts are soluble in toluene used as a solvent, so that only a polymer whose particle diameter is extremely small (in general, approximately 1 to 50 μm) may be obtained. For this reason, it has been difficult, to the best of our knowledge, by the above method, to industrially produce polymers with high efficiency. Moreover, it is necessary to use a large amount of an alumoxane in the above method, so that the production cost becomes high. In order to solve these problems, various proposals have been made. In Japanese Laid-Open Patent Publications Nos. 51408/1989, 275609/1989 and 140305/1991, alumoxane and a metallocene compound are brought into contact with each other in advance to obtain a particulate polymer. However, a particulate polymer can be obtained only when the above method is applied to so-called liquid phase bulk polymerization in which propylene is used as a solvent, and a polymer having a controlled particle diameter cannot be obtained when it is applied to slurry polymerization in which an inert solvent is used, or to gas phase polymerization.

In Japanese Laid-Open Patent Publications Nos. 296008/1986, 51407/1988 and 152608/1988, and WO 88-05058, such catalysts that a catalytic component is supported on an inorganic oxide, particularly on silica, are proposed. By this technique, it has become possible to prepare a particulate polymer even by gas phase polymerization. However, the activity per catalyst is low because the amount of the catalytic component which can be supported on silica is limited, and, in addition, the silica tends to remain in a polymer prepared. These are the causes of deterioration in the quality of the polymer, that is, the polymer is to have, for example, reduced moldability, a rough surface or fish eyes. This technique would therefore be unfavorable.

On the other hand, in Japanese Laid-Open Patent Publication No. 92621/1988 and WO 88-05058, it is proposed to support a catalytic component on polyethylene particles. By this method, deterioration in the quality of a polymer produced, which would be inherent in the use of an inorganic oxide as a carrier, can be prevented. However, a catalytic component would not be fully supported on polyethylene particles as compared with the case where an inorganic oxide is used as the support. For this reason, not only the activity becomes low but also the catalytic component is detached from the carrier while polymerization is conducted. As a result, a large amount of fine particles are produced, and thus the object which is to obtain a particulate polymer cannot be fully attained. Further, this proposal is carried out only for the preparation of ethylene polymers in which the activity is easily revealed. Therefore, a technique by which the preparation of particulate polypropylene is feasible has been desired.

When a propylene block copolymer having high rigidity and a high impact strength is prepared by polymerization, a rubbery copolymer is generally formed in an increased proportion in the resultant copolymer in order to enhance the impact strength of the resultant block copolymer. However, in this case, the amount of a by-product is increased, and polymer particles adhere to one another or to the inner wall of an apparatus. Therefore, it tends to be difficult to stably and continuously operate an apparatus used for preparing the polymer for a long period of time.

Recently, in order to improve the impact strength at low temperatures, proposals have been made such that, at a first stage, crystalline polypropylene is formed in the presence of liquid propylene and, at a latter stage, propylene and ethylene or an α-olefin having 4 to 20 carbon atoms are copolymerized, wherein use is made of a metallocene catalyst (EP-433989, EP-433990 and Japanese Laid-Open Patent Publication No. 114050/1992). As long as we know, however, although the impact resistance at low temperatures of the polymer product may be improved when the polymer is produced by the method proposed, a finely particulate polymer would be formed, and polymer particles would also tend to agglomerate with one another or to adhere to the inner wall of a polymerization vessel when the amount of the polymer produced at the latter stage is increased. Therefore, it would not be easy to prepare a copolymer stably by this method.

On the other hand, elastomeric polyolefins, which are useful as impact resistant polymer or as an additive for improving impact resistance of "hard" polymers, may be produced with catalysts based on vanadium used in a solution polymerization method. The vanadium based catalysts may have some drawbacks that it may not be feasible to conduct polymerization at elevated temperatures whereby productivity of polymers per a polymerization vessel may be at a lower level resulting in production of polymers at a higher cost.

The vapor/gas phase polymerization, which may produce polymers in higher productivity, has been desired.

The present invention has been made in order to solve the aforementioned problems in the prior art. Objects of the present invention are therefore to provide a catalyst for use in the polymerization of olefins, capable of producing polymers which have been improved in their particle properties even when the catalyst is used in slurry polymerization or gas phase polymerization, in particular, a catalyst capable of producing polypropylenes, of which production has been difficult by the prior art technology, without using a large amount of an alumoxane compound; and a method for preparing an olefin polymer by using the catalyst.

Another object of the present invention is to prepare propylene block copolymers and/or thermoplastic elastomers having improved impact resistance without entailing the formation of fine particles, agglomeration of particles or adhesion of particles to the wall of a polymerization vessel even when a rubbery copolymer is formed in an increased ratio.

SUMMARY OF THE INVENTION

The present invention has been accomplished as a result of studies which were made in order to attain the above objects of the invention.

The present invention provides an improved process for producing α-olefin polymers in which an α-olefin is contacted with a catalyst to polymerize, wherein the improvement comprises the use as the catalyst of a solid product comprising Components (ii) and (iii) supported on Component (i):

Component (i) being an organic porous polymer having an average particle diameter of 5 to 1,000 μm, in which the total pore volume of all pores whose diameter is 0.006 to 10 μm is no smaller than 0.3 cc/g, and the total pore volume of all pores whose diameter is 0.05 to 2 μm is no smaller than 50% of that of all pores whose diameter is 0.006 to 10 μm;

Component (ii) being a compound having the structure

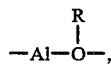

in which R is a hydrocarbyl group having 1 to 10 carbon atoms; and

Component (iii) being a compound of a transition metal of the Groups IVB to VIB in the Periodic Table, having at least one conjugated 5-membered cyclic ligand.

According to the present invention, propylene polymers having good particle properties, of which preparation has been considerably difficult, can be obtained at a high yield as products having a low content of ash, such as an inorganic oxide, and the catalyst is also improved in both the activity-retaining ability and preservability. It is assumed that these effects would not be expected from the prior art.

DETAILED DESCRIPTION OF THE INVENTION

Catalyst

The catalyst for use in the process of the present invention is one obtained by making Components (ii) and (iii) be supported on Component (i), or one obtained by making Components (ii) and (iii) be supported on Component (i), and then subjecting the resultant product to preliminary polymerization in which it is brought into contact with an olefin under the gas phase condition to polymerize the olefin. The expression "one obtained by making Components (ii) and (iii) be supported on Component (i)" herein includes not only one obtained by making only Components (ii) and (iii) be supported on Component (i), but also one obtained by making a component other than Components (ii) and (iii) be supported together with Components (ii) and (iii) on Component (i).

Component (i)

The Component (i) is an organic porous polymer having an average particle diameter of 5 to 1000 μm, preferably 10 to 700 μm, more preferably 20 to 500 μm, in which the total pore volume of all pores whose diameter is 0.006 to 10 μm is 0.3 cc/g or more, preferably 0.8 cc/g or more, more preferably 1.0 cc/g or more, and the total pore volume of all pores whose diameter is 0.05 to 2 μm is 50% or more, preferably 60% or more of the total pore volume of all pores whose diameter is 0.006 to 10 μm.

When Component (i) has a total pore volume of all pores whose diameter is 0.006 to 10 μm which is less than 0.3 cc/g, it can be impregnated with only a small amount of the catalytic components, Components (ii) and (iii), so that the activity per catalyst may not be fully obtained. It may be difficult to impregnate those pores which have a diameter of less than 0.05 μm with the catalytic components, particularly an alumoxane, Component (ii). When the component (i) has a large number of pores having a diameter of more than 2 μm, the catalytic components, Components (ii) and (iii), are detached from the carrier particles while polymerization is conducted, and initiate or continue polymerization. This is the cause of the formation of a fine particulate polymer. The pore volume and the diameter of pores herein described are those measured by a porosimeter ("Pore Sizer 9310" manufactured by Micromelitex Inc.). The average particle diameter of Component (i) means a value which is determined by obtaining the distribution of a number-average particle diameter by a microscopic observation using an image analyzer "Spica II" manufactured by Nihon Abionix Co., Ltd., converting it to the distribution of a weight-average particle diameter, and reading the value at the weight of 50%, that is, $D_{50}$.

There is no limitation on the type of the polymer of the organic porous polymer having the above-described characteristics as long as the polymer fulfill the above requirements. However, in general, the polymer includes (a) polymers of an α-olefin having 2 to 10 carbon atoms, such as polyethylene, polypropylene, polybutene-1, an ethylene-propylene copolymer, an ethylene-butene-1 copolymer, an ethylene-hexene-1 copolymer, a propylene-butene-1 copolymer, a propylene-hexene-1 copolymer and a propylene-divinylbenzene copolymer, (b) polymers of styrene or its derivative having a hydrocarbyl substituent at its nucleus and/or side chain, such as polystyrene and a styrene-divinylbenzene copolymer, and (c) polar polymers containing O, N or halogen atom, such as a polyacrylate, a polymethacrylate, a polyacrylonitrile, a polyvinyl chloride, a polyamide, a polyphenylene ether, a polyethylene terephthalate and a polycarbonate.

Of these polymers, polymers of an α-olefin and polymers of an aromatic unsaturated compound are preferred because they hardly cause a side reaction with the catalytic components; and more preferable polymers are those of an α-olefin which is the same type as that of a desired polymer to be finally produced.

The porosity desired may be obtained by subjecting the particles of these polymers to solvent extraction.

Component (ii)

Component (ii) is a compound having a structure

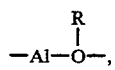

in which R represents a hydrocarbyl group having 1 to 10 carbon atoms.

A typical example of the compound (ii) is an alumoxane. An alumoxane is a product obtained from one species of a trialkylaluminium or from two or more trialkylaluminiums, and water. Specifically, those obtained from one trialkylaluminium, such as methylalumoxane, ethylalumoxane, butylalumoxane and isobutylalumoxane, and those obtained from two trialkylaluminiums, such as methylethylalumoxane, methylbutylalumoxane and methylisobutylalumoxane may be mentioned.

In the present invention, the above alumoxanes can be used either in combination of two or more or in combination with another alkylaluminium, for example, a combination of an alumoxane with trimethylaluminium, triethylaluminium, triisobutylaluminium or dimethylaluminium chloride.

It is also possible to use a modified alumoxane obtained by reacting two species of alumoxanes, or by reacting one species of an alumoxane with another organoaluminium compound.

Of these, methylalumoxane, isobutylalumoxane, methyl isobutylalumoxane, a combination of any of these alumoxanes with a trialkylaluminium are preferred. Methylalumoxane and methylisobutylalumoxane are more preferred.

In particular, methylisobutylalumoxane having a chemical shift between 160 and 250 ppm with a line width of 3,000 Hz or more, determined by a measurement using $^{27}$Al-NMR is preferable for polymerization of propylene.

These alumoxanes can be prepared under any of various known conditions. Specifically, the following methods can be mentioned:

(a) the method in which trialkylaluminium is directly reacted with water in a proper organic solvent such as toluene, benzene or ether;
(b) the method in which trialkylaluminium is reacted with a salt hydrate having crystal water, for example, a hydrate of copper sulfate or aluminium sulfate;
(c) the method in which a trialkylaluminium is reacted with water with which silica gel or the like has been impregnated;
(d) the method in which trimethylaluminium and tributylaluminium are mixed, and the mixture is directly reacted with water in a proper organic solvent such as toluene, benzene or ether;
(e) the method in which trimethylaluminium and tributylaluminium are mixed, and the mixture is reacted, under heating, with a salt hydrate having crystal water, for example, a hydrate of copper sulfate or aluminium sulfate;
(f) the method in which silica gel is impregnated with water, treated with triisobutylaluminium, and then additionally treated with trimethylaluminium; and
(g) the method in which methyl alumoxane and isobutyl alumoxane are synthesized respectively by known methods, and these two components are mixed in a predetermined proportion and reacted by heating.

Another typical example of Component (ii) is an organoaluminium oxy compound represented by the following formula (I):

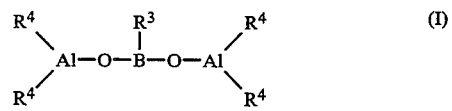

wherein $R^3$ is a hydrocarbyl radical having 1 to 10 carbon atoms, and $R^4$ is hydrogen, halogen, a siloxy group, a siloxy group substituted by a lower alkyl group, or a hydrocarbyl group having 1 to 10 carbon atoms, wherein the four R4s may be the same or different from one another.

The compound of formula (I) is a reaction product of the following components (a) and (b).

The component (a) is an alkylboric acid represented by the following general formula:

$$R^3-B-(OH)_2$$

wherein $R^3$ represents a hydrocarbyl group having 1 to 10 carbon atoms. Specific examples of the component (a) include methylboric acid, ethylboric acid, isopropylboric acid, n-propylboric acid, n-butylboric acid, isobutylboric acid, n-hexylboric acid, cyclohexylboric acid, phenylboric acid, 3,5-difluorophenylboric acid, pentafluorophenylboric acid and 3,5bis(trifluoromethyl)-phenylboric acid.

Of these, methylboric acid, ethylboric acid, n-butylboric acid, isobutylboric acid, 3,5-difluorophenylboric acid and pentafluorophenylboric acid are preferred, and methylboric acid, ethylboric acid and n-butylboric acid are more preferred.

The component (b) which is reacted with the component (a) to yield Component (ii) is an organoaluminium compound.

Examples of the component (b) includes compounds represented by any of the following general formulas:

$$R^4{}_{3-q}AlX_q,$$

$$R^4{}_{3-q}Al-[OSi-(R^9)_3]_q,$$

and $$(R^4)_2-Al-O-Al-(R^4)_2,$$

wherein $R^4$ represents a hydrocarbyl group having 1 to 10 carbon atoms, X represents hydrogen or a halogen group, $R^9$ represents hydrogen, halogen or a hydrocarbyl group having 1 to 10 carbon atoms, and q is $0 < q \leq 3$.

Specific examples of the component (b) include:
(a) trialkylaluminiums such as trimethylaluminium, triethylaluminium, tri-n-butylaluminium, triisobutylaluminium, trihexylaluminium, trioctylaluminium, tridecylaluminium, tri-n-butylaluminium, tri-n-propylaluminium and triisoprenylaluminium, (b) alkylaluminium halides such as dimethylaluminium chloride, diethylaluminium monochloride, diethylaluminium monofluoride, diisobutylaluminium monochloride, methylaluminium sesquichloride, ethylaluminium sesquichloride and ethylaluminium dichloride, (c) alkylaluminium hydrides such as dimethylaluminium hydride, diethylaluminium hydride and diisobutylaluminium hydride, (d) alkylaluminium siloxides such as dimethylaluminium (trimethylsiloxide), dimethylaluminium (trimethylsiloxide) and diethylaluminium (trimethylsiloxide), and (e) tetraalkyl alumoxanes such as tetraisobutyl alumoxane and tetraethyl alumoxane. Two or more of the above compounds can also be used in combination.

Component (iii)

Component (iii) is a compound of a transition metal which belongs to one of the Groups IVB to VIB in the Periodic Table, having at least one conjugated 5-membered cyclic ligand. Typical examples of the compounds include transition metal compounds represented by the following general formula (1):

and by the following general formula (2):

In the above formulas, Q represents a binding group or a "bridge" which crosslinks the two conjugated 5-membered cyclic ligands, and S represents a binding group or a "bridge" which crosslinks the conjugated 5-membered cyclic ligand and the group Z. Specifically, Q and S are (a) an alkylene group such as a methylene, ethylene, isopropylene, phenylmethylmethylene, diphenylmethylene or cyclohexylene group; (b) a silylene group such as silylene, dimethylsilylene, phenylmethylsilylene, diphenylsilylene, disilylene or tetramethyldisilylene group; or (c) a hydrocarbyl group containing germanium, phosphorus, nitrogen, boron or aluminium, specifically, a $(CH_3)_2Ge$, $(C_6H_5)_2Ge$, $(CH_3)P$, $(C_6H_5)P$, $(C_4H_9)N$, $(C_6H_5)N$, $(CH_3)B$, $(C_4H_9)B$, $(C_6H_5)B$, $(C_6H_5)Al$ or $(CH_3O)Al$ group, preferably an alkylene or a silylene group, more preferably methylene with or without a substituent thereon, ethylene with or without a substituent thereon, silylene with or without a substituent thereon, and disilylene with or without a substituent thereon where the substituent may preferably be a lower alkyl or phenyl, a is 0 or 1, b, c and d are: $0 \leq b \leq 5$, $0 \leq c \leq 5$ and $0 \leq d \leq 5$ when a is 0; and $0 \leq b \leq 4$, $0 \leq c \leq 4$ and $0 \leq d \leq 4$ when a is 1.

In the above general formulas, the conjugated 5-membered cyclic ligands represented by $(C_5H_{5-a-b}R^1_b)$, $(C_5H_{5-a-c}R^2_c)$ and $(C_5H_{5-a-d}R^3_d)$ respectively are defined separately. However, the definitions themselves of b, c and d are the same among them, and those of $R^1$, $R^2$ and $R^3$ are also the same among them (described later in detail). It is therefore needless to say that these three conjugated 5-membered cyclic ligands may be the same or different from one another.

One specific example of the conjugated 5-membered cyclic ligand is a cyclopentadienyl group which is the compound of the formula in which b (or c or d) is 0 and has no substituent other than the binding group Q or S. In the case where the conjugated 5-membered cyclic ligand is one in which b (or c or d) is not 0 thus having a substituent, a specific example of $R^1$ (or $R^2$ or $R^3$) is a $C_1-C_{20}$, preferably $C_1-C_{12}$ hydrocarbyl group. This hydrocarbyl group may be bound to the cyclopentadienyl group as a monovalent group; or when a plurality of the hydrocarbyl groups are existing, two of them may be bound to each other at their respective ω-terminus to form a ring together with a part of the cyclopentadienyl group. A typical example of the latter is a case where two of $R^1$ (or $R^2$ or $R^3$) forms a condensed 6-membered ring together with a double bond of the cyclopentadienyl group, whereby this conjugated 5-membered cyclic group is an indenyl or fluorenyl group. Therefore, typical examples of this conjugated 5-membered cyclic group are substituted or unsubstituted cyclopentadienyl, indenyl and fluorenyl groups.

$R^1$ $R^2$ and $R^3$ are each, in addition to a $C_1-C_{20}$, preferably $C_1-C_{12}$ hydrocarbyl group, a halogen atom (e.g. fluorine, chlorine or bromine), an alkoxy group (e.g. a $C_1-C_{12}$ alkoxy group), a silicon-containing hydrocarbyl group (e.g. a group having approximately 1 to 24 carbon atoms, containing a silicon atom in the form of $-Si(R)(R')(R'')$), a phosphorus-containing hydrocarbon group (e.g. a group having approximately 1 to 18 carbon atoms, containing a phosphorus atom in the form of $-P(R)(R')$), a nitrogen-containing hydrocarbon group (e.g. a group having approximately 1 to 18 carbon atoms, containing a nitrogen atom in the form of $-N(R)(R')$) or a boron-containing hydrocarbon group (e.g. a group having approximately 1 to 18 carbon atoms, containing a boron atom in the form of $-B(R)(R')$), respectively. When b (or c or d) is 2 or more and a plurality of $R^1$s (or $R^2$s or $R^3$s) are existing, they may be the same or different.

b, c and d are an integer which fulfills the conditions of $0 \leq b \leq 5$, $0 \leq c \leq 5$ and $0 \leq d \leq 5$ when a is 0, and $0 \leq b \leq 4$, $0 \leq c \leq 4$ and $0 \leq d \leq 4$ when a is 1.

Me is a transition metal belonging to one of the Groups IVB to VIB in the Periodic Table, preferably titanium, zirconium and hafnium. Zirconium is particularly preferred.

Z is oxygen ($-O-$), sulfur ($-S-$), an alkoxy group having 1 to 20, preferably 1 to 10 carbon atoms, a thioalkoxy group having 1 to 20, preferably 1 to 12 carbon atoms, a silicon-containing hydrocarbon group having 1 to 40, preferably 1 to 18 carbon atoms, a nitrogen-containing hydrocarbon group having 1 to 40, preferably 1 to 18 carbon atoms, or a phosphorus-containing hydrocarbon group having 1 to 40, preferably 1 to 18 carbon atoms. When a is 1, a part of the group Z is bound to the group S, a binding group.

X and Y are a hydrogen atom, a halogen atom, a hydrocarbyl group having 1 to 20, preferably 1 to 10 carbon atoms, an alkoxy group having 1 to 20, preferably to 10 carbon atoms, an amino group, a phosphorus-containing hydrocarbon group having 1 to 20, preferably 1 to 12 carbon atoms (specifically, for example, a diphenylphosphine group), or a silicon-containing hydrocarbon group having 1 to 20, preferably 1 to 12 carbon atoms (specifically, for example, a trimethylsilyl group or a bis(trimethylsilyl)methyl group), respectively. X and Y may be the same or different. Of these, a halogen atom and a hydrocarbyl group are preferred.

The compounds represented by the above formula (1) or (2) are called metallocenes. Specifically, they are called zirconocenes (Me=Zr), titanocenes (Me=Ti) or hafnocenes (Me=Hf) depending on the type of Me.

Specific examples of the transition metal compound in which Me is zirconium are as follows:
(a) transition metal compounds which have two conjugated 5-membered cyclic ligands but have no binding group for crosslinking the ligands, for instance, (1) bis(cyclopentadienyl)zirconium dichloride,
(2) bis(methylcyclopentadienyl)zirconium dichloride, (3) bis(dimethylcyclopentadienyl)zirconium dichloride,
(4) bis(trimethylcyclopentadienyl)zirconium dichloride,
(5) bis(tetramethylcyclopentadienyl)zirconium dichloride,
(6) bis(pentamethylcyclopentadienyl)zirconium dichloride,
(7) bis(n-butylcyclopentadienyl)zirconium dichloride,
(8) bis(indenyl)zirconium dichloride,
(9) bis(fluorenyl)zirconium dichloride,
(10) bis(cyclopentadienyl)zirconium monochloride monohydride,
(11) bis(cyclopentadienyl)methylzirconium monochloride,
(12) bis(cyclopentadienyl)ethylzirconium monochloride,
(13) bis(cyclopentadienyl )phenylzirconium monochloride,
(14) bis(cyclopentadienyl )zirconium dimethyl,
(15) bis(cyclopentadienyl )zirconium diphenyl,
(16) bis(cyclopentadienyl )zirconium dineopentyl,
(17) bis(cyclopentadienyl )zirconium dihydride,
(18) bis(cyclopentadienyl )(indenyl)zirconium dichloride, and
(19) bis(cyclopentadienyl)(fluorenyl)zirconium dichloride;

(b) transition metal compounds having two 5-membered cyclic ligands crosslinked by an alkylene group, for instance, (1) methylenebis(indenyl)zirconium dichloride,
(2) ethylenebis(indenyl)zirconium dichloride,
(3) ethylenebis(indenyl)zirconium monohydride monochloride,
(4) ethylenebis(indenyl)methylzirconium monochloride,
(5) ethylenebis(indenyl)monomethoxyzirconium monochloride,
(6) ethylenebis(indenyl)zirconium diethoxide,
(7) ethylenebis(indenyl)zirconium dimethyl,
(8) ethylenebis(4,5,6,7-tetrahydroindenyl)zirconium dichloride,
(9) ethylenebis(2-methylindenyl)zirconium dichloride,
(10) ethylenebis(2,4,6-trimethylindenyl)zirconium dichloride,
(11) ethylenebis(2-methylbenzoindenyl)zirconium dichloride,
(12) ethylenebis(2-methyl-4,5,6,7-tetrahydroindenyl)zirconium dichloride,
(13) ethylenebis(2-methyl-4-phenylindenyl)zirconium dichloride,
(14) ethylenebis (2-ethylindenyl)zirconium dichloride,
(15) ethylenebis (2,4-dimethylindenyl)zirconium dichloride,
(16) ethylene(2,4-dimethylcyclopentadienyl)(3',5'-dimethylcyclopentadienyl)zirconium dichloride,
(17) ethylene(2-methyl-4-tert-butylcyclopentadienyl) (3'-tert-butyl-5'-methylcyclopentadienyl)zirconium dichloride,
(18) ethylene(2,3,5-trimethylcyclopentadienyl) (2',4',5'-trimethylcyclopentadienyl)zirconium dichloride,
(19) isopropylidenebis(indenyl)zirconium dichloride,
(20) isopropylidene(2,4-dimethyl cyclopentadienyl)(3',5'-dimethylcyclopentadienyl)zirconium dichloride,
(21) isopropylidene(2-methyl-4-tertbutylcyclopentadienyl)(3'-tert-butyl-5'-methylcyclopentadienyl)zirconium dichloride,
(22) methylene(cyclopentadienyl)(3,4-dimethylcyclopentadienyl)zirconium dichloride,
(23) methylene(cyclopentadienyl) (3,4-dimethylcyclopentadienyl)zirconium chloride hydride,
(24) methylene(cyclopentadienyl) (3,4-dimethylcyclopentadienyl)zirconium dimethyl,
(25) methylene(cyclopentadienyl)(3,4-dimethylcyclopentadienyl)zirconium diphenyl,
(26) methylene(cyclopentadienyl)(trimethylcyclopentadienyl)zirconium dichloride,
(27) methylene(cyclopentadienyl)(tetramethylcyclopentadienyl)zirconium dichloride,
(28) isopropylidene(cyclopentadienyl)(3,4-dimethylcyclopentadienyl)zirconium dichloride,
(29) isopropylidene(cyclopentadienyl)(2,3,4,5-tetramethylcyclopentadienyl)zirconium dichloride,
(30) isopropylidene(cyclopentadienyl)(3-methylindenyl)zirconium dichloride,
(31) isopropylidene(cyclopentadienyl)(fluorenyl)zirconium dichloride,
(32) isopropylidene(2-methylcyclopentadienyl)(fluorenyl)zirconium dichloride,
(33) isopropylidene(2,5-dimethylcyclopentadienyl)(3',4'-dimethylcyclopentadienyl)zirconium dichloride,
(34) isopropylidene(2,5-dimethylcyclopentadienyl)(fluoro)zirconium dichloride,
(35) ethylene(cyclopentadienyl)(3,5-dimethylcyclopentadienyl)zirconium dichloride,
(36) ethylene(cyclopentadienyl)(fluorenyl)zirconium dichloride,
(37) ethylene(2,5-dimethylcyclopentadienyl)(fluorenyl)zirconium dichloride,
(38) ethylene(2,5-diethylcyclopentadienyl)(fluorenyl)zirconium dichloride,
(39) diphenylmethylene(cyclopentadienyl)(3,4diethylcyclopentadienyl)zirconium dichloride,
(40) cyclohexylidene(cyclopentadienyl)(fluorenyl)zirconium dichloride, and
(41) cyclohexylidene(2,5-dimethylcyclopentadienyl)(3',4'-dimethyldimethylcyclopentadienyl)zirconium dichloride;

(c) transition metal compounds having 5-membered cyclic ligands crosslinked by a silylene group, for instance, (1) dimethylsilylenebis(indenyl)zirconium dichloride,
(2) dimethylsilylenebis(4,5,6,7-tetrahydroindenyl)zirconium dichloride,
(3) dimethylsilylenebis(2-methyl-4,5,6,7-tetrahydroindenyl)zirconium dichloride,
(4) dimethylsilylenebis(2-methylindenyl)zirconium dichloride,
(5) dimethylsilylenebis(2-methylbenzoindenyl)zirconium dichloride,
(6) dimethylsilylenebis(2-methyl-4-phenylindenyl)zirconium dichloride,
(7) dimethylsilylene(2,4-dimethylcyclopentadienyl)(3',5'-dimethylcyclopentadienyl)zirconium dichloride,
(8) phenylmethylsilylenebis(indenyl)zirconium dichloride,
(9) phenylmethylsilylenebis(4,5,6,7-tetrahydroindenyl)zirconium dichloride,
(10) phenylmethylsilylene(2,4-dimethylcyclopentadienyl)(3',5'-dimethylcyclopentadienyl)zirconium dichloride,

(11) phenylmethylsilylene(2,3,5-trimethylcyclopentadienyl)(2',4',5'-trimethylcyclopentadienyl)zirconium dichloride,
(12) phenylmethylsilylenebis(tetramethylcyclopentadienyl)zirconium dichloride,
(13) diphenylsilylenebis(indenyl)zirconium dichloride,
(14) diphenylsilylenebis(2-methylindenyl)zirconium dichloride,
(15) tetramethyldisilylenebis(indenyl)zirconium dichloride,
(16) tetramethyldisilylenebis(cyclopentadienyl)-zirconium dichloride,
(17) tetramethyldisilylene(3-methylcyclopentadienyl)-(indenyl)zirconium dichloride,
(18) dimethylsilylene(cyclopentadienyl)(3,4-dimethylcyclopentadienyl)zirconium dichloride,
(19) dimethylsilylene(cyclopentadienyl)(trimethylcyclopentadienyl)zirconium dichloride,
(20) dimethylsilylene(cyclopentadienyl)(tetramethylcyclopentadienyl)zirconium dichloride,
(21) dimethylsilylene(cyclopentadienyl)(3,4-diethylcyclopentadienyl)zirconium dichloride,
(22) dimethylsilylene(cyclopentadienyl)(triethylcyclopentadienyl)zirconium dichloride,
(23) dimethylsilylene(cyclopentadienyl)(tetraethylcyclopentadienyl)zirconium dichloride,
(24) dimethylsilylene(cyclopentadienyl)(fluorenyl)zirconium dichloride,
(25) dimethylsilylene(cyclopentadienyl)(2,7-di-t-butylfluorenyl)zirconium dichloride,
(26) dimethylsilylene(cyclopentadienyl)(octahydrofluorenyl)zirconium dichloride,
(27) dimethylsilylene(2-methylcyclopentadienyl)(-fluorenyl)zirconium dichloride,
(28) dimethylsilylene(2,5-dimethylcyclopentadienyl)(-fluorenyl)zirconium dichloride,
(29) dimethylsilylene(2-ethylcyclopentadienyl)(-fluorenyl)zirconium dichloride,
(30) dimethylsilylene(2,5-diethylcyclopentadienyl)(-fluorenyl)zirconium dichloride,
(31) diethylsilylene(2-methylcyclopentadienyl)(2',7'-di-t-butylfluorenyl)zirconium dichloride,
(32) dimethylsilylene(2,5-dimethylcyclopentadienyl)-(2',7'-di-t-butyl fluorenyl)zirconium dichloride,
(33) dimethylsilylene(2-ethylcyclopentadienyl)-(2',7'-di-t-butylfluorenyl)zirconium dichloride,
(34) dimethylsilylene(diethylcyclopentadienyl)-(2',7'-di-t-butylfluorenyl)zirconium dichloride,
(35) dimethylsilylene(methylcyclopentadienyl)(octahydrofluorenyl)zirconium dichloride,
(36) dimethylsilylene(dimethylcyclopentadienyl)(octahydrofluorenyl)zirconium dichloride,
(37) dimethylsilylene(ethylcyclopentadienyl)(octahydrofluorenyl)zirconium dichloride, and
(38) dimethylsilylene(diethylcyclopentadienyl)(octahydrofluorenyl)zirconium dichloride;

(d) transition metal compounds having 5-membered cyclic ligands crosslinked by a hydrocarbon group containing germanium, aluminium, boron, phosphorus or nitrogen, for instance, (1) dimethylgermaniumbis(indenyl)zirconium dichloride,
(2) dimethylgermanium(cyclopentadienyl)(fluorenyl)zirconium dichloride,
(3) dimethylaluminiumbis(indenyl)zirconium dichloride,
(4) phenylaluminiumbis(indenyl)zirconium dichloride,
(5) phenylphosphinobis(indenyl)zirconium dichloride,
(6) ethylboranobis(indenyl)zirconium dichloride,
(7) phenylaminobis(indenyl)zirconium dichloride, and
(8) phenylamino(cyclopentadienyl)(fluorenyl)zirconium dichloride;

(e) transition metal compounds having one 5-membered cyclic ligand, for instance, (1) pentamethylcyclopentadienyl-bis(phenyl)aminozirconium dichloride,
(2) indenyl-bis(phenyl)aminozirconium dichloride,
(3) pentamethylcyclopentadienyl-bis(trimethylsilyl)aminozirconium dichloride,
(4) pentamethylcyclopentadienylphenoxyzirconium dichloride,
(5) dimethylsilylene(tetramethylcyclopentadienyl)-phenylaminozirconium dichloride,
(6) dimethylsilylene(tetramethylcyclopentadienyl)tetrabutylaminozirconium dichloride,
(7) dimethylsilylene(tetrahydroindenyl)decylaminozirconium dichloride,
(8) dimethylsilylene(indenyl)cyclohexylaminozirconium dichloride,
(9) dimethylsilylene(tetrahydroindenyl)((trimethylsilyl)amino)zirconium dichloride, and
(10) dimethylgerman(tetramethylcyclopentadienyl)(-phenyl)aminozirconium dichloride; and (f) those compounds which are obtained by substituting chlorine in the above compounds (a) to (e) with bromine, iodine, hydride, methyl, phenyl or the like.

Further, in the present invention, any of those compounds which are obtained by changing the central metal of the zirconium compounds enumerated in the above (a) to (f) to titanium, hafnium, niobium, molybdenum or tungsten can also be used as the component (iii).

Of these, zirconium, hafnium and titanium compounds are preferred, and zirconium, titanium and hafnium compounds in which the ligands are crosslinked by an alkylene or silylene group, preferably "short" chain group set forth hereinabove as more preferable species, are more preferred.

Preparation of Solid Catalyst

The solid catalyst of the present invention is a product obtained by making Components (ii) and (iii) be supported on Component (i), or by subsequently subjecting the product obtained to preliminary polymerization in which it is brought into contact with an olefin to polymerize the olefin under the gas phase condition. Any method can be employed in order to make Components (ii) and (iii) be supported on Component (i). However, in general, (a) a method in which Components (ii) and (iii) are dissolved in an inert solvent capable of dissolving them, the solution is mixed with Component (i), and the solvent is then distilled off under reduced pressure or under a stream of an inert gas;p (b) the method in which Components (ii) and (iii) are dissolved in an inert solvent, the solution is concentrated to such a degree that a solid is not precipitated, and Component (i) is then added in such an amount that the whole quantity of the concentrated solution can be supported in the particles of Component (i); and (c) the method in which a solution of Components (ii) and (iii) is gradually made to be supported on Component (i) can be mentioned.

Components (ii) and (iii) in the present invention are, in general, solid materials, and, accordingly, a method in which Components (ii) and (iii) are made to be supported in Component (i) by impregnating Component (i) with Components (ii) and (iii) by the use of an inert solvent which can solubilize Components (ii) and (iii) is a particularly preferable embodiment. Benzene, toluene, xylene, hexane, heptane, octane, dekalin, dichloromethane, dichloroethane, chloropropane, chlorobenzene or the like is used as the inert solvent. The solvent used can remain in the impregnation product. There is no limitation on the amount of the inert solvent which remains in the impregnation product, and it varies depending on the pore volume of the organic porous polymer (the component (i)) used. However, it is generally 0 to 70% by weight, preferably 5 to 50% by weight, of the organic porous polymer in the impregnation product. When the amount of the remaining inert solvent is in excess of 70% by weight, the particles of the organic porous polymer impregnated with the solvent may not exist independently nor in a free flowing state, and become to the state of agglomerate or sludge. As a result, the subsequent polymerization may not proceed stably; or, when the impregnation product is subjected to preliminary polymerization, the catalyst which has undergone preliminary polymerization tends to contain extremely fine particles of the catalyst which have been produced upon preliminary polymerization by the catalyst present outside the catalyst particles. It is noted that the amount of the remaining inert solvent may affect the activity at the time of gas phase preliminary polymerization, and that the preliminary polymerization can be readily controlled when approximately 5% by weight or more of the inert solvent remains.

The above-described operation for impregnation is conducted, in general, under an inert atmosphere at a temperature ranging from $-78°$ C. to $100°$ C., preferably from $-78°$ C. to $50°$ C. Time for the impregnation process can be determined freely. However, it is generally within 24 hours, preferably within 10 hours.

Components (i), (ii) and (iii) can be used in any amount. However, in general, an alumoxane, Component (ii), is used in the range of 0.1 g to 10 g, preferably 0.3 g to 5 g, for 1 g of Component (i). When this amount is less than 0.1 g, the activity per the solid catalyst may not be fully obtained. On the other hand, when the amount is in excess of 10 g, an alumoxane which is not supported in Component (i) is to remain as independent particles, and these particles reveal activity together with Component (iii), producing a finely particulate polymer.

Component (iii) can also be used in any amount. However, in general, the amount of Component (iii) in a molar ratio is 1 to 10,000, preferably 10 to 3,000, more preferably 30 to 1,000, per an aluminium atom in Component (ii).

When preliminary polymerization is conducted where the solid product comprising Component (i) having thereon or impregnated with Components (ii) and (iii) is contacted with an olefin under the gas phase condition, ethylene, propylene, butene-1, 3-methylbutene-1 or a mixture thereof may be used as the olefin monomer. In order to control the molecular weight of the polymer at the preliminary polymerization, it is also possible to use hydrogen, if necessary. The preliminary polymerization is conducted at a temperature ranging from $-78°$ C. to $100°$ C., preferably from $-78°$ C. to $50°$ C. The preliminary polymerization time is in the range of 1 minute to 24 hours, preferably 5 minutes to 10 hours. The amount of a polymer produced at the preliminary polymerization is in the range of 0.0 g to 500 g, preferably 0.1 g to 100 g, more preferably 0.2 g to 30 g, per 1 g of the solid product or catalyst comprising Components (i)+(ii)+(iii) obtained by impregnating Component (i) with Components (ii) and (iii). When this amount is less than 0.01 g, the effect of the gas phase preliminary polymerization may not be obtained, and the catalytic components, Components (ii) and (iii), may tend to be detached from the solid catalyst when used in the main polymerization to be conducted thereafter whereby a finely particulate polymer will be produced. When the amount of a polymer at the preliminary polymerization is more than 500 g, the product of preliminary polymerization is a kind of a polymer rather than a solid catalyst. For this reason, the activity at the time of the main polymerization may tend to be lowered and the handling of the catalyst (feeding means, the structure of a tank housing the catalyst to be fed, and the like) may also tend to be difficult.

Use of Solid Catalyst/Polymerization of Olefin

The catalyst according to the present invention is not only applied to slurry polymerization wherein a solvent is used but also to liquid-phase solvent-free polymerization, gas phase polymerization and melt polymerization which use substantially no solvent. The catalyst of the present invention can also be applied to continuous polymerization and batch-wise polymerization.

A saturated aliphatic or aromatic hydrocarbon such as hexane, heptane, pentane, cyclohexane, benzene or toluene is used singly or in combination of two or more as a solvent for use in the slurry polymerization.

The solid catalyst of the present invention shows remarkable capability of forming a polymer in improved granulometric properties when it is used in gas phase polymerization.

The polymerization temperature is approximately $-78°$ C. to $200°$ C., preferably $-20°$ C. to 100C. There is no particular limitation on the olefin pressure in the reaction system. However, the pressure is preferably in the range of normal pressure to 50 kg/cm$^2$G. In addition, upon conducting the polymerization, the molecular weight may be controlled by any known means, for example, by selecting the temperature and pressure, or by introducing hydrogen to the system.

It is needless to say that the polymerization proceeds when the solid catalyst of the present invention and monomers are present. However, it is also possible to conduct the polymerization in the presence of an organoaluminium compound in the system in order to enhance the polymerization activity or to counteract a catalytic poison.

Specific examples of such an organoaluminium compound include compounds represented by $R^5_{3-n}AlX_n$ or $R^6_{3-m}Al(OR^7)_m$, wherein $R^5$ and $R^6$ which may be the same or different, are a hydrocarbon radical having approximately 1 to 20 carbon atoms or a hydrogen atom, $R^7$ is a hydrocarbon radical having approximately 1 to 20 carbon atoms, X is halogen, and n and m are a number of $0 \leq n < 3$ and $0 < m < 3$ respectively; and compounds represented by the following general formula (I) or (II):

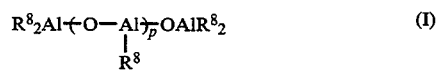

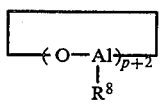 (II)

in which p is a number of 0 to 50, preferably 2 to 25, and $R^8$ represents a hydrocarbon radical, preferably one having 1 to 10 carbon atoms, particularly 1 to 4 carbon atoms.

Specifically, the following compounds can be mentioned as the organoaluminium compound:
(a) trialkylaluminiums such as trimethylaluminium, triethylaluminium, triisobutylaluminium, trihexylaluminium, trioctylaluminium and tridecylaluminium; (b) alkylaluminium halides such as diethylaluminium monochloride, diisobutylaluminium monochloride, ethylaluminium sesquichloride and ethylaluminium dichloride; (c) alkylaluminium hydrides such as diethylaluminium hydride and diisobutylaluminium hydride; (d) aluminium alkoxides such as diethylaluminium ethoxide and diethylaluminium phenoxide; and (e) alumoxanes such as methyl alumoxane, ethyl alumoxane, isobutyl alumoxane and methylisobutyl alumoxane. It is also possible to use a mixture of two or more of the above compounds. Of these compounds, trialkylaluminiums and alumoxanes are preferred.

A further or a third component can be added to the solid catalyst of the present invention with or without an organoaluminium compound combined therewith as an optional component, and examples of such a further component include active-hydrogen-containing compounds such as $H_2O$, methanol, ethanol and butanol; electron-donor compounds such as an ether, an ester and an amine; alkoxy-containing compounds such as phenyl borate, dimethylmethoxyaluminium, phenyl phosphite, tetraethoxysilane and diphenyldimethoxysilane; and Lewis acids such as triphenylboron, tris(pentafluorophenyl)boron and triphenylcarbyltetrakis(pentafluorophenyl)boron.

The catalyst for use in the method according to the present invention is formed by bringing the components of the above-described solid catalyst and an optional component which is added when necessary into contact with one another inside or outside the polymerization system at the same time or by stages.

An olefin which is polymerized by the use of the catalyst of the present invention, that is, an olefin which is used for the polymerization reaction in the process according to the present invention is preferably an α-olefin having 2 to 20, preferably 2 to 10 carbon atoms. Specific examples of such an α-olefin include ethylene, propylene, 1-butene, 4-methyl-1-pentene, 1-hexene, 1-octene, 1-decene, 1-dodecene, 1-tetradecene, 1-hexadecene, 1-octadecene and 1-eicocene. Of these, ethylene, propylene, 1-butene and 1-hexene are particularly preferred. It is also possible to use a mixture of two or more of these α-olefins.

As specific examples of copolymerization, it is also possible to copolymerize any of the above α-olefins and ethylene by the use of the catalyst of the present invention. Moreover, the catalyst of the present invention is also useful for copolymerization of any of the above α-olefins and other copolymerizable monomer, for example, a conjugated or unconjugated diene such as butadiene, 1,4-hexadiene, 1,8-nonadiene or 1,9-decadiene, or a cyclic olefin such as cyclopentene, cyclobutene, cyclooctene, norbornene or dicyclopentadiene.

The solid catalyst of the present invention may preferably be used in a polymerization process for producing propylene block copolymers which comprises at least two stages, a first step polymerization and a second step polymerization.

Two-step polymerization for producing propylene block copolymers

1st Step Polymerization

A first step polymerization is a process in which propylene or a mixture of propylene and ethylene is supplied to a polymerization system containing the above-described solid catalyst and an optional component which is added when necessary, and polymerized in a single stage or multiples stages to produce a propylene crystalline homopolymer or a propylene-ethylene copolymer having an ethylene content of 5% by weight or less, preferably 1.0% by weight or less in an amount of 30 to 95% by weight, preferably 50 to 90% by weight, more preferably 60 to 90% by weight, of the total amount of the polymerization product produced in the two steps.

When the ethylene content of the propylene-ethylene copolymer obtained by a first step polymerization exceeds 5% by weight, the rigidity of the copolymer and, in turn, of the propylene block copolymer, is reduced, and the amount of a low-crystalline polymer as a by-product is drastically increased. The amount of a low-crystalline polymer as a by-product is increased also when the amount of polymer in the first step is less than the lower limit of the above-described range. On the other hand, when the amount of polymer in the first step exceeds the upper limit of the above-described range, the effect of improving the impact strength of a polymer, which is an object of the production of the block copolymer, may not be obtained.

A gas phase method in which no liquid solvent is substantially used and each monomer is maintained substantially in a gaseous state can be adopted as a polymerization manner for the initial polymerization. This method can be conducted by continuous polymerization, batch-wise polymerization, or a manner in which prepolymerization is conducted. Further, as long as monomers are maintained in a gaseous state, the presence of a small amount of an inert solvent or a liquid monomer is not excluded. In this case, a saturated aliphatic or aromatic hydrocarbon such as hexane, heptane, pentane, cyclohexane, benzene or toluene, or a mixture thereof is used as the inert solvent.

The polymerization temperature is approximately $-70°$ C. to $200°$ C., preferably $0°$ C. to $150°$ C., and hydrogen may be additionally used as a molecular-weight modifier when the polymerization is conducted at this temperature. It is suitable to conduct the polymerization under a pressure of 0 to 90 kg/cm²G, preferably 0 to 60 kg/cm²G, and particularly 1 to 50 kg/cm²G.

Further, in order to enhance the activity, not to produce a by-product polymer which is soluble in a solvent, and to prevent the melting point of the polymer desired from lowering, it is desirable to use a solid catalyst which has undergone the preliminary polymerization wherein propylene is polymerized before conducting the main polymerization. In this case, it is sufficient enough that the amount of propylene polymerized at the preliminary polymerization to the total amount of the polymer produced be generally 10% by weight or less, preferably 5% by weight or less.

In this case, the temperature for preliminarily polymerizing propylene is, in general, the same as or lower than the temperature for the subsequent main polymerization. The temperature for the preliminary polymerization of propylene is therefore −30° C. to 70° C., preferably 0° to 50° C. A pressure of, in general, normal pressure to 20 kg/cm²G, preferably normal pressure to 5 kg/cm²G can be adopted for this preliminary polymerization. However, the pressure is not necessarily limited to the above range as long as the proportion of the amount of propylene polymerized at the preliminary polymerization to the amount of the desired copolymer produced is within the above range.

The molecular weight of the polymer formed at the first step can be controlled by adding hydrogen to the polymerization step.

2nd Step Polymerization

A second step polymerization is a process in which a mixture of propylene and ethylene and/or an α-olefin having 4 to 20 carbon atoms is further introduced to the polymerization system subsequently to the first polymerization to obtain a copolymer of propylene/ethylene and/or the α-olefin having 4 to 20 carbon atoms, having the comonomer content of 20 to 100 mol %, preferably 30 to 80 mol %, more preferably 30 to 70 mol %, the comonomer being at least one monomer selected from the group consisting of ethylene and α-olefins having 4 to 20 carbon atoms, in a single stage or multiple stages wherein the polymerization activity at the first polymerization is utilized, that is, at least a part of the polymerization catalyst used in the first step polymerization is utilized. In this process, it is desirable to produce a polymer in an amount corresponding to 5 to 70% by weight, preferably 10 to 50% by weight, more preferably 10 to 40% by weight, of the total amount of the polymers produced in both the steps.

The polymerization temperature for the second step polymerization is approximately 0° C. to 90° C., preferably about 40° C. to 80° C. The polymerization pressure is, in general, in the range of 1 to 50 kg/cm²G.

It is preferable that a polymerization system or a polymerization vessel be purged of propylene gas or propylene/ethylene mixture gas and hydrogen after the first step polymerization is completed, and before the second step polymerization is started.

In the second step polymerization, a molecular-weight modifier may be or may not be used depending on the purpose.

Manner of Polymerization

The second step polymerization according to the present invention can also be conducted by any of a batch-wise, continuous or semi batch-wise method. In these case, it is preferable that monomers which are substantially in a gaseous state be polymerized without any liquid medium used. As long as the monomers are maintained substantially in a gaseous state, it is not excluded that a small amount of an inert solvent or a monomer in a liquid state is present in the polymer and/or the solid catalyst impregnated therewith.

Block Copolymer Produced

A polymer obtained in the first step polymerization is a stereoregular polymer having an [mm] or [rr] triad fraction according to $^{13}$C-NMR of 0.80 or more. The [mm] or [rr] fraction of the polymer according to $^{13}$C-NMR spectrum is one determined by using "JEOL FX-200" manufactured by JEOL, Ltd. under such conditions that the temperature is 130° C., the frequency is 50.1 MHz, the spectral width is 8000 Hz, the pulse repeating time is 2.0 seconds, the pulse width is 7 microseconds, and the integral number is 10,000 to 50,000 times. The spectrum obtained was analyzed in accordance with the method by A. Zambelli (Macromolecules, 21, 617(1988)) and the method by Tetsuro Asakura (the preprints for the meeting of the Society of Polymer Science, Japan, 36 (8), 2408 (1987)).

The [mm] or [rr] triad fraction herein means the ratio (y/x) of the number (y) of triads in the [mm] or [rr] structure to the total number (x) of triads which are in three possible stereoisomers, that is, triads in the [mm] (isotactic), [mr] (heterotactic) and [rr] (syndiotactic) structures, wherein "triad" is a "trimer unit" which is a monomer unit in an α-olefin polymer and a minimum unit of a stereostructure.

The number-average molecular weight (Mn) of the polymer obtained in the first step polymerization is usually from 20,000 to 200,000. When the Mn is less than 20,000, the polymer finally produced may not have a sufficiently high viscosity when melted, so that it is difficult to mold this polymer. On the other hand, when the Mn is in excess of 200,000, it is impossible to retain the rigidity of the polymer high contrary to the object of the present invention. The Mn is preferably between 30,000 and 100,000.

The molecular-weight distribution of the polymer obtained, expressed by the Mw/Mn ratio determined by gel permeation chromatography (GPC), is in the range of 3.5 or less, preferably 1 to 2.8. In general, a polymer obtained with a catalyst used consisting of a metallocene compound and an alumoxane is one having an Mw/Mn of 3.5 or less. Those polymers which have an Mw/Mn of more than 3.5 may contain a relatively increased amount of low-molecular-weight matters, so that the amount of soluble matter as a by-product is increased, and it may also be difficult to retain the rigidity high.

It is noted that the measurement by means of gel permeation chromatography was carried out according to a method set forth in "Gel Permeation Chromatography" authored by Takeuchi, published by Maruzen Co., Ltd. Japan. Namely, the Mw/Mn value was determined with a standard polystyrene used (homodisperse polystyrene, manufactured by Toyo Soda Manufacturing Co., Ltd.) having a known molecular weight, obtaining the number-average molecular weight (Mn) and the weight-average molecular weight (Mw) of a polymer by calculation in accordance with the universal method. The measurement was conducted by using 150C-ALC/GPC manufactured by Waters Manufacturing, Inc., and three AD80M/S columns manufactured by Showa Denko K. K. A sample was prepared by dissolving the polymer in o-dichlorobenzene to give a 0.2 wt % solution, and 200 μl of this sample was used for the measurement. The measurement was carried out at a temperature of 140° C. and at a flow rate of 1 ml/min.

The block copolymer obtained by the method according to the present invention is characterized in that the copolymerization ratio ($r_p \times r_{EN}$) of the polymer obtained by extraction of the polymer obtained after the second step polymerization with cold xylene in the second step polymerization is 2.0 or less. A preferable copolymerization ratio is 1.0 or less. In the case of copolymerization of propylene and ethylene, the reaction ratio of monomers is expressed by the product of $r_p$ and $r_{EN}$. The $r_p$ and $r_{TN}$ are calculated, as described in K. Soga, Macromol. Chem., 191, p. 2854 (1990), by the equations $r_p = 2[PP]/[PE]X$ and $r_{EN} = 2[EE]X/[PE]$ (X=propylene/ethylene (molar ratio of propylene to ethylene charged in a solvent)), respectively. It is required that the value of $r_p \times r_{EN}$ be in the range of 2.0 or less, preferably 1.0 or less.

Further, the number-average molecular weight of the polymer obtained by the second step polymerization is 50,000 or more, preferably 90,000 or more. When this is less than 50,000, the effect of improving the impact resistance is so small that the aimed effect of the present invention may not be obtained.

Production of elastomers

Polymerization for producing particulate elastomers may be performed by a vapor/gas phase method wherein monomers concerned are held as gas substantially without a liquid solvent, in any polymerization mode including continuous and batch-wise polymerization and a method in which preliminary polymerization is practiced. As long as the monomers are maintained at a gaseous state, a small amount of an inert liquid solvent and/or any of the monomers in a liquid state may be permissible to present in the polymerization. Examples of such inert liquid solvents include saturated aliphatic and aromatic hydrocarbons such as hexane, heptane, pentane, cyclohexane, benzene and toluene as such or in combination.

The polymerization temperature may be approx. $-78°$ C. to 200° C., preferably 0° to 150° C., hydrogen being used upon necessity for regulating the molecular weight of the resultant polymer, and the polymerization pressure may be 0 to 90 kg/cm$^2$G, preferably 0 to 60 kg/cm$^2$G, more preferably 1 to 50 kg/cm$^2$G.

In order to improve the activity of catalyst, to reduce the amount of a soluble polymer as a by-product or to prevent lowering of a melting point, the catalyst can be subjected to preliminary polymerization where propylene or ethylene as it is or in combination with another α-olefin is polymerized by the catalyst to form a small amount of the polymer, for example, up to 10% by weight, preferably 5% by weight, of the total amount of the polymer. Excessively high amount of the polymer at the preliminary polymerization may lower the elastomeric properties of the elastomer desired. The temperature for the preliminary polymerization is, in general, at the same as or lower than the level at which the subsequent main polymerization is conducted, and may be $-30°$ to 70° C., preferably 0 to 50C. The polymerization pressure may, in general, be atmospheric to 20 kg/cm$^2$G preferably atmospheric to 5 kg/cm$^2$G, although the pressure may not be restricted in the range, as long as the amount of polymer at the preliminary polymerization is within the range given above.

The elastomer may be prepared from a combination of two or more monomers of ethylene, propylene, an α-olefin of 4 to 20 carbon atoms, such as combination of ethylene/propylene, ethylene/1-butene, ethylene/1-hexene, propylene/1-butene, and propylene/1-hexene; and ethylene/propylene/1-butene, and ethylene/propylene/ethylidenenorbornene. The monomeric compositional ratio may be 10/1 to 1/10 for a two-monomers combination of monomer (1)/monomer (2) and 10/1/0.1 to 1/10/1 for a three-monomers combination of monomer (1)/monomer (2)/monomer (3), where monomers (1), (2) and (3) are such that monomer (1) has the lowest molecular weight in any of the combinations and monomer (3) has the highest molecular weight and monomer (2) is in between.

Measurement of Practical Physical Properties

An additive having the following formulation was incorporated into the polymer obtained in any of the following Examples, and the resulting mixture having the composition as shown in Table 1 was melted and kneaded in a plastomill manufactured by Toyo Seiki Co., Ltd. having an internal volume of 60 ml at a temperature of 230° C. at a velocity of 60 rpm for 6 minutes. The resulting mixture was press-molded at 230° C. to prepare a sheet having a thickness of 2 mm. Various test pieces were obtained by cutting the sheet, and subjected to the evaluation of the practical physical properties of the polymer.

| Formulation of Additive: | |
| --- | --- |
| 2,6-di-tert-butyl phenol | 0.10% by weight |
| RA 1010 (Trademark, manufactured by Ciba-Geigy, Ltd.) | 0.05% by weight |

Methods of Measurement and Evaluation (a) Flexural Modulus

Test pieces having a width of 25 mm and a length of 80 mm were obtained by cutting, and the flexural modulus was measured in accordance with JIS K 7203 by using an Instron tester.

(b) Izod Impact Strength

Three sheets of test pieces, each having a thickness of 2 mm were placed one over another, and the notched Izod impact strength at 23° C. was measured in accordance with JIS K 7110.

EXAMPLES

Example-A1

Preparation of Catalytic Component (iii)

Dimethylsilylbis(tetrahydroindenyl)zirconium dichloride was synthesized in accordance with the methods described in J. Orgmet. Chem., (342) 21–29, 1988 and J. Orgmet. Chem., (369) 359–370, 1989.

Specifically, in a 300 ml flask purged with nitrogen, 5.4 g of bis(indenyl)dimethylsilane was diluted with 150 ml of tetrahydrofuran and the mixture was cooled to no higher than $-50°$ C. To this mixture, 23.6 ml of n-butyl lithium (1.6 M/L) was added dropwise over 30 minutes. After the addition was completed, the mixture was warmed to room temperature over 1 hour, and a reaction was carried out at room temperature for 4 hours to synthesize a reaction solution A.

To a 500 ml flask purged with nitrogen, 200 ml of tetrahydrofuran was introduced and cooled to a temperature of no higher than $-50°$ C. 4.38 g of zirconium tetrachloride was then gradually introduced to the flask, followed by the whole quantity of the reaction solution A. The mixture was gradually warmed to room temperature over 3 hours. After a reaction was carried out at room temperature for two hours, the reaction mixture was warmed to 60° C., and the reaction was carried out for further two hours. After the reaction was completed, the solvent was distilled off under reduced pressure, and the residue was dissolved in 100 ml of toluene. The solvent was distilled off again, thereby giving 3.86 g of crude crystals of dimethylsilylbis(indenyl)zirconium dichloride.

Subsequently, the crude crystals were dissolved in 150 ml of dichloromethane, and the solution was introduced to a 500 ml autoclave. After 5 g of a platinum-carbon (0.5 wt % of platinum supported) catalyst was introduced to the autoclave, a hydrogenation reaction was carried out under a hydrogen pressure of 50 kg/cm$^2$G at a temperature of 50° C. for 5 hours. After the reaction was completed, the catalyst was filtered off, and the solvent was distilled off under reduced pressure. The residue was extracted with toluene and then recrystallized to give 1.26 g of the desired compound, dimethylsilylbis(tetrahydroindenyl)zirconium dichloride.

Preparation of Component (ii)

To a 1000 ml flask thoroughly purged with nitrogen, equipped with a stirrer and a reflux condenser, 100 ml of toluene which had been dehydrated and deoxygenated was introduced. Subsequently, 0.72 g (10 mmol) of trimethylaluminium and 1.96 g (10 mmol) of triisobutylaluminium were diluted in 50 ml of toluene in one of two dropping funnels, and toluene containing saturated water was introduced to the other funnel. The mixed aluminium solution and the toluene containing saturated water were fed to the flask at 30° C. over 3 hours in such a manner that an equimolar amount of the Al and the H$_2$O were fed at the same time. After the feeding was completed, the mixture was heated to 50° C., and a reaction was carried out for 2 hours. After the reaction was completed, the solvent was distilled off under reduced pressure, thereby obtaining 1.9 g of a white solid. The white solid thus obtained was dissolved in toluene, and the solution was subjected to a measurement using $^{27}$Al-NMR. As a result, a spectrum having a chemical shift at 174 ppm with a half band width of 5844 Hz was obtained.

Preparation of Solid Catalyst

Porous polypropylene powder (Trademark "Accurel", 200–400 μm classified product) manufactured by Akzo N. V. was used as Component (i). This powder had a pore volume of pores having a diameter between 0.05 to 2.0 μm of 1.89 cc/g, and a total pore volume of all pores having a diameter between 0.006 to 10 μm of 2.54 cc/g.

To a 300 ml flask thoroughly purged with nitrogen, 3 g of the above-described porous polypropylene manufactured by Akzo N. V., Component (i), and a solution in 40 ml of toluene of approximately 1.8 g (0.0228 mol) of the above-synthesized methylisobutylalumoxane, Component (ii), were introduced. Subsequently, 42 mg (0.94 mmol) of the above-synthesized dimethylsilylenebis(tetrahydroindenyl)zirconium dichloride was introduced. Thereafter, while stirring the mixture, the toluene was distilled off at room temperature under a stream of nitrogen over 1 hour so that polypropylene particles would be able to flow independently. A part of the resultant was taken out and dried at 50° C. under reduced pressure. As a result, the weight loss of the mixture was found to be 15%, and the toluene was collected in a cooled trap.

The above-obtained impregnated solid was subjected to preliminary polymerization where propylene was prepolymerized which flew thereover under atmospheric pressure. The preliminary polymerization was conducted at a temperature between 10° C. and 20° C. for 30 minutes by controlling the flow of propylene gas while cooling the system with ice water. The polymerization temperature was controlled by cooling the system with ice water and also by changing the mixing ratio of circulating gas, namely a mixture of propylene and nitrogen. After the preliminary polymerization was completed, a solid produced was collected. As a result, 11.5 g of the solid was obtained. The Zr content of this solid was 0.71 mg/g. The polymer yield at the preliminary polymerization was 800 g per 1 g of Zr.

Polymerization of Propylene

To an autoclave equipped with a stirrer and having an internal volume of 1.5 liter was introduced 80 g of table salt which had been thoroughly dehydrated and purged with nitrogen. The inside of the autoclave was then heated to 50° C., and replaced by propylene. Subsequently, 0.6 g of the above-obtained solid catalyst was introduced, and gas phase polymerization was conducted under a propylene pressure of 7 kg/cm$^2$G at a temperature of 50° C. for 2 hours. After the polymerization was completed, the solid produced was collected, and the table salt was washed away from the solid with a large amount of water. The resultant was dried, thereby giving 22 g of a polymer. The yield was therefore 51.6 kg per 1 g of Zr. The melting point of the polymer was 127.7° C. The [mm] triad fraction of the polymer, determined by a measurement using $^{13}$C-NMR, was 0.86. The number-average molecular weight determined by GPC was 14,700, the Q value (Mw/Mn) was 2.46 and the average particle diameter was 1.6 mm.

Example-A2

Polymerization was conducted under the same conditions as in Example-A1 except that the time for the polymerization of propylene was changed to 6 hours. The results are shown in Table 1.

Example-A3

After the solid catalyst obtained in Example-A1 was preserved under a nitrogen atmosphere for 1 month, polymerization was conducted under the same conditions as in Example-A1. The results are shown in Table 1.

Examples-A4 to A6

Polymerization was conducted under the same conditions as in Example-A1 except that 0.11 g of polymethylalumoxane (with 16 monomers associated) manufactured by Tosoh-Akzo Co., Ltd., polyisobutylalumoxane manufactured by Tosoh-Akzo Co. Ltd., or triisobutylaluminium was used as an optional component together with 0.6 g of the solid catalyst at the time of the polymerization of propylene. The results are shown in Table 1.

Example-A7

Preparation of Solid Catalyst

A solid catalyst was prepared under the same conditions as in Example-A1 except that 2.5 g of methylisobutylalumoxane, Trademark "MMAO" (modified methylalumoxane), manufactured by Tosoh-Akzo Co., Ltd. was used instead of the methylisobutylalumoxane, Component (ii), used in Example-A1, and that 70.7 mg of the dimethylsilylenebis(tetrahydroindenyl)zirconium dichloride, Component (iii), was used. It is noted that a broad spectrum having a chemical shift at 190 ppm with a half band width of 6550 Hz was obtained when the above-described "MMAO" manufactured by Tosoh-Akzo Co., Ltd. was subjected to a measurement using $^{27}$Al-NMR. The toluene content of the impregnated solid was approximately 8% by weight. The Zr content of the solid catalyst having undergone the preliminary polymerization was 1.21 mg/g, and the yield at the preliminary polymerization was 440 g per 1 g of Zr.

Polymerization of Propylene

Polymerization was conducted under the same conditions as in Example-A1 except that 0.5 g of the above-obtained solid catalyst and 0.12 g of the "MMO" manufactured by Tosoh-Akzo Co., Ltd., which was the same one as was used in the above preparation of the solid catalyst, were used. The results are shown in Table 2.

Comparative Example-A1

Preparation of Solid Catalyst 3 g, 1.8 g and 46 mg of Components (i), (ii) and (iii) which were the same ones as were used in Example-A1 were used, respectively. They were dissolved in 40 ml of toluene. To this solution, 60 ml of n-heptane was further added to precipitate a reaction product. Subsequently, the resulting mixture which was in a slurry state was subjected to preliminary polymerization which was conducted at 20° C. for 30 minutes by feeding propylene in a circulatory manner under atmospheric pressure. After the preliminary polymerization was completed, a supernatant liquid was removed by decantation, and the residue was washed three times with 200 ml of n-heptane. The solvent was then distilled off under reduced pressure, thereby giving 10.5 g of a desired solid catalyst. In this solid catalyst, 0.61 mg/g of Zr was contained, and the polymer yield at the preliminary polymerization was approximately 890 g per 1 g of Zr.

Polymerization of Propylene

Polymerization was conducted under the same conditions as in Example-A1 except that 0.8 g of the above-obtained solid catalyst was used. The results are shown in Table 1. The polymer thus obtained contains many fine particles whose diameter is 300 μm or less, so that it is unfavorable for the operation of gas phase polymerization.

Examples-A8 and A9

4 g of porous polypropylene powder (Trademark "Accurel", <100μ classified product) manufactured by Akzo N. V. was used as Component (i). This powder had a pore volume of pores having a diameter between 0.05 and 2.0 μm of 1.66 cc/g, and a total pore volume of all pores having a diameter between 0.006 and 10 μm of 2.33 cc/g.

2.5 g of the same "MMAO" manufactured by Tosoh-Akzo Co., Ltd. as was used in Example-A7 as Component (ii), and 56.3 mg of the dimethylsilylenebis(tetrahydroindenyl)zirconium dichloride synthesized in Example-A1 were diluted in 40 ml of toluene, and the mixture was added to Component (i). The toluene was then removed by a stream of nitrogen over 30 minutes, thereby obtaining an impregnated solid. The toluene content of the impregnated solid was approximately 6% by weight.

Subsequently, preliminary polymerization was conducted in the same manner as in Example-A1, that is, under a stream of propylene at a temperature of 10° C. to 20° C. for 30 minutes. Thus, 12.8 g of a desired solid catalyst was obtained. 0.82 mg/g of Zr was contained in this catalyst, and the polymer yield at the preliminary polymerization was 600 g per 1 g of Zr.

Polymerization of Propylene

Polymerization was conducted under the same conditions as in Example-A1 or A7 except that 0.6 g of the above-obtained solid catalyst was used. The results are shown in Table 2.

Examples-A10 and A11

Preparation of Component (i)

To a 2000 ml glass flask, 20 g of polypropylene powder (upon a measurement by a porosimeter, the powder was found to have a pore volume of pores having a diameter of 0.006 to 10 μm of 0.016 cc/g, an average pore diameter of 160 angstrom, and an average particle diameter of 210 to 300 μm) was introduced, followed by 320 ml of n-heptane, 1280 ml of n-octane and 1 g of boiling stone. While stirring, the mixture was heated to the boiling point of the above solvent mixture. After the temperature reached the boiling point, the solvent mixture was removed in 15 minutes. The resulting polypropylene powder was then dried by blowing of nitrogen.

By this extracting process, porous polypropylene powder which is fit for the object of the present invention was obtained. Upon a measurement by a porosimeter, the powder thus obtained was found to have a pore volume of pores having a diameter between 0.05 and 2 μm of 0.981 cc/g, a pore volume of pores having a diameter between 0.006 and 10 μm of 1.14 cc/g, and an average particle diameter of 210 to 300 μm.

Preparation of Solid Catalyst

A solid catalyst was prepared under the same conditions as in Example-A7 except that 4 g of the above-obtained Component (i), 2.5 g of the same "MMAO" manufactured by Tosoh-Akzo Co., Ltd. as was used in Example-A7, and, as Component (iii), 48.5 mg of the dimethylsilylenebis(tetrahydroindenyl)zirconium dichloride were used, whereby 9.8 g of a solid catalyst was obtained. In this catalyst, 0.93 mg/g of Zr was contained, and the polymer yield at the preliminary polymerization was approximately 350 g per 1 g of Zr.

Polymerization of Propylene

Polymerization was conducted under the same conditions as in Example-A1 or A7 except that 0.6 g of the above-obtained solid catalyst was used. The results are shown in Table 2.

Comparative Examples-A2 and A3

A solid catalyst was prepared in the same manner as in-Example-A10 or A11 except that the polypropylene powder before subjected to the removal of the solvent mixture of n-heptane and n-octane by extraction was used as Component (i). The Zr content of this catalyst was 0.70 mg/g, and the polymer yield at the preliminary polymerization was 880 g per 1 g of Zr.

Polymerization of propylene was conducted under the same conditions as in Example-A1 or A7. The results are shown in Table 2.

Comparative Examples-A4 and A5

Polymerization was conducted under the same conditions as in Comparative Example-A1 or A2 except that 4 g of silica (#952) manufactured by Fuji-Davison Chemical, Ltd. was used as Component (i). The results are shown in Table 2. The Zr content of the catalyst was 0.97 mg/g, and the polymer yield at the preliminary polymerization was approximately 330 g per 1 g of Zr.

Comparative Example-A6

After the solid catalyst prepared in Comparative Example-A4 was preserved under a nitrogen atmosphere for 1 month, polymerization was conducted under the same conditions as in Comparative Example-A1. The results are shown in Table 2.

Example-A12

Preparation of Component (iii)

Isopropylidene(cyclopentadienyl)(fluorenyl)zirconium dichloride was synthesized in the following manner.

To a 500 ml flask thoroughly purged with nitrogen, 200 ml of THF and 5 g of fluorene were introduced, and the mixture was cooled to a temperature of no higher than −50° C. 67 ml of a dilute solution of methyllithium in diethyl ether (1.4M) was then added dropwise to the mixture over 30 minutes. The resulting mixture was warmed to room temperature, and a reaction was carried out for three hours. Subsequently, the reaction mixture was cooled again to no higher than −50° C., and 10 g of 6,6-dimethylfulvene was added dropwise to it over 30 minutes. After the addition was completed, the mixture was gradually warmed to room temperature, and a reaction was carried out two over nights. After the reaction was completed, 60 ml of $H_2O$ was added to the mixture to terminate the reaction. The ether layer was separated, dehydrated by using anhydrous $MgSO_4$, and dried by evaporation. Thus, 17.6 g of crude crystals of 2-cyclopentadienyl-2-fluorenyl propane was obtained.

Subsequently, 10 g of the above-obtained crude crystals were dissolved in 100 ml of THF, and the solution was cooled to no higher than −50° C. To this solution, 46.0 ml (0.0736 mol) of n-butyllithium was added dropwise over 10 minutes. The mixture was warmed to room temperature over 1 hour, and a reaction was carried out at room temperature for 2 hours. Thereafter, the solvent was removed by evaporation under a stream of nitrogen, and the residue was dried. 100 ml of dichloromethane was added to this, and the mixture was cooled to no higher than −50° C. To this mixture, a solution which had been obtained by mixing 8.16 g of zirconium tetrachloride with 50 ml of dichloromethane at a low temperature was fed without a rest. After mixing, the mixture was gradually warmed over three hours, and a reaction was carried out at room temperature one overnight. After the reaction was completed, a solid matter was removed by filtration, and a filtrate was subjected to concentration and recrystallization, thereby obtaining 4.68 g of isopropylidene(cyclopentadienyl)(fluorenyl)zirconium dichloride, Component (iii), which was red in color.

Preparation of Solid Catalyst

A solid catalyst was prepared by the same method as in Example-A7 except that 65.5 mg of the above-obtained Component (iii) was used. The Zr content of the catalyst was 0.88 mg/g, and the polymer yield at the preliminary polymerization was 650 g per 1 g of Zr.

Polymerization of Propylene

Polymerization was conducted under the same conditions as in Example-A7 except that 0.8 g of the above-obtained solid catalyst was used. The results are shown in Table 3.

Example-A13

Preparation of Component (iii)

Dimethylsilylenebis(2-methylindenyl)zirconium dichloride was synthesized in the following manner.

In a 500 ml a reaction vessel made of glass, 4.3 g (33 mmol) of 2-methylindene was dissolved in 80 ml of tetrahydrofuran, and 21 ml of a 1.6M hexane solution of n-butyllithium was gradually added dropwise to the solution while cooling. The mixture was stirred at room temperature for 1 hour, and then cooled again. To this mixture, 2.1 g of dimethyldichlorosilane was gradually added dropwise, and the mixture was stirred at room temperature for 12 hours. Thereafter, 50 ml of water was added. An organic layer was separated, and dried, thereby giving 3.5 g of dimethylbis(2-methylindenyl)silane.

3.5 g of the above-obtained dimethylbis(2-methylindenyl)silane was dissolved in 7.0. ml of tetrahydrofuran, and 13.9 ml of a 1.6M hexane solution of n-butyllithium was gradually added to this solution dropwise while cooling. The mixture was stirred at room temperature for three hours, and then gradually added dropwise to a solution of 2.6 g (11 mmol) of zirconium tetrachloride in 60 ml of tetrahydrofuran. The mixture was stirred for 5 hours. Hydrogen chloride gas was then blown into the mixture, and the mixture was dried. Subsequently, methylene chloride was added to the mixture to separate a soluble matter which was crystallized at a low temperature. Thus, 0.45 g of orange powder was obtained.

Preparation of Solid Catalyst

A solid catalyst was prepared by the same method as in Example-A7 except that 98 mg of the above-obtained Component (iii) was used. The Zr content of the catalyst was 1.35 mg/g, and the polymer yield at the preliminary polymerization was 430 g per 1 g of Zr.

Polymerization of Propylene

Polymerization was conducted under the same conditions as in Example-A7 except that 1.0 g of the above-obtained solid catalyst was used. The results are shown in Table 3.

Example-A14

Synthesis of Component (iii)

Ethylenebis(indenyl)zirconium dichloride was synthesized in accordance with J. Orgmet. Chem., (288) 63–67, 1985.

Preparation of Solid Catalyst

A solid catalyst was prepared by the same method as in Example-A7 except that 60.8 mg of the above-obtained Component (iii) was used. The Zr content of the catalyst was 1.02 mg/g, and the polymer yield at the preliminary polymerization was 350 g per 1 g of Zr.

Polymerization of Propylene

Polymerization was conducted under the same conditions as in Example-A7 except that 1.0 g of the above-obtained solid catalyst was used. The results are shown in Table 3.

Example-A15

Preparation of Propylene/Ethylene Random Copolymer

To an autoclave equipped with a stirrer and having an internal volume of 1.5 liter, 80 g of table salt which had been thoroughly dehydrated and purged with nitrogen was introduced. The inside of the autoclave was then heated to 30° C., and replaced by propylene. Subsequently, 0.8 g of the solid catalyst prepared in Example-A1 was introduced to the autoclave. Gas phase polymerization was conducted under a propylene pressure of 7 kg/cm$^2$G at 30° C. for 2 hours with a feed of ethylene at a rate of 0.0375 g/min. After the polymerization was completed, the solid produced was collected, and the table salt was washed away from the solid with a large amount of water. The resultant was dried, thereby giving 29.3 g of a polymer. The yield was therefore 51.6 kg per 1 g of Zr. The melting point of the polymer was 117.2° C. The [mm] triad fraction rate of the polymer, determined by a measurement using $^{13}$C-NMR, was 0.93, and the ethylene content was 3.01 mol %. The number-average molecular weight determined by GPC was 23,700, the Q value (Mw/Mn) was 2.28, and the average particle diameter was 1.6 mm.

Example-A16

Polymerization of Ethylene

To an autoclave equipped with a stirrer and having an internal volume of 1.5 liter, 80 g of table salt which had been thoroughly dehydrated and purged with nitrogen was introduced. The inside of the autoclave was heated to 80° C., and replaced by ethylene. After 50 cc of hydrogen was fed, polymerization was conducted with 0.5 g of the solid catalyst used which was prepared in Example-A4 under an ethylene pressure of 7 kg/cm$^2$G at a temperature of 85° C. for 2 hours. The catalytic activity was 96.3 kg per 1 g of Zr. Upon measurement by GPC, the polymer obtained had an Mn of 21,500 and a Q value of 2.88.

TABLE 1

| | Component (i) | Component (ii) | Component (iii) | Yield at Prepolymerization (for Zr) | Remarks | Activity (g/g Zr) | Melting Point (°C.) | [mm] | Mn/Q | Average particle diameter (μ) |
|---|---|---|---|---|---|---|---|---|---|---|
| Example-A1 | Polypropylene manufactured by Akzo N.V. (210~300 μ) | Methylisobutyl-alumoxane | Dimethylsilylenebis-(tetrahydroindenyl)-zirconium dichloride | 800 g/g Zr | | 51,600 | 127.7 | 0.86 | 14,700/ 2.45 | 1,600 |
| Example-A2 | ↓ | ↓ | ↓ | ↓ | Polymerization for 6 hours | 155,000 | 126.1 | 0.85 | 13,800/ 2.55 | 2,100 |
| Example-A3 | ↓ | ↓ | ↓ | ↓ | After one-month preservation | 48,800 | 126.8 | 0.86 | 14,500/ 2.38 | 1,600 |
| Example-A4 | ↓ | ↓ | ↓ | ↓ | Methylalumoxane was also used at the polymeriztion | 84,000 | 127.3 | 0.86 | 14,800/ 2.55 | 1,700 1,700 |
| Example-A5 | ↓ | ↓ | ↓ | ↓ | Polyisobutyl-alumoxane was also used at the polymerization | 63,500 | 126.7 | 0.86 | 14,800/ 2.78 | 1,600 |
| Example-A6 | ↓ | ↓ | ↓ | ↓ | Triisobutyl-aluminum was also used at the polymerization | 76,300 | 127.5 | 0.86 | 13,800/ 2.38 | 1,700 |
| Example-A7 | ↓ | MMAO manufactured by Tosoh-Akzo Co., Ltd. | ↓ | 440 | MMAO manufactured by Tosoh-Akzo Co., Ltd. was also used at the polymerization | 96,000 | 126.8 | 0.85 | 14,200/ 2.35 | 1,750 |
| Comparative Example-A1 | ↓ | Methylisobutyl-alumoxane | ↓ | 890 890 | Prepolymerization was conducted under the slurry condition | 32,500 | 125.5 | 0.87 | 14,500/ 3.11 | 300 μm or less: 47/% |

TABLE 2

| | Component (i) | Component (ii) | Component (iii) | Yield at Prepolymerization (for Zr) | Co-Use of MMAO at the polymerization | Activity (g/g Zr) | Melting Point (°C.) | [mm] (%) | Mn/Q | Average particle diameter/ 149 μm or less |
|---|---|---|---|---|---|---|---|---|---|---|
| Example-A8 | Polypropylene (Accurel) (<100 μ) manufactured | MMAO manufactured by | Dimethylsilylenebis (tetrahydroindenyl)- | 600 g/gZr | no | 75,300 | 129.0 | 87.5 | 13,500/ 2.20 | 255/ 5.0 |
| Example-A9 | | | | | yes | 94,000 | 128.8 | 87.0 | 12,800/ 2.55 | 280 3.4 |

TABLE 2-continued

|  | Component (i) | Component (ii) | Component (iii) | Yield at Pre-polymer-ization (for Zr) | Co-Use of MMAO at the polymer-ization | Acti-vity (g/g Zr) | Mel-ting Point (°C.) | [mm] (%) | Mn/Q | Average particle diameter/ 149 μm or less |
|---|---|---|---|---|---|---|---|---|---|---|
|  | by Akzo N.V. | Tosoh-Akzo Co., Ltd. | zirconium dichloride |  |  |  |  |  |  |  |
| Example-A10 | Polypropylene having undergone extraction with a mixture of heptane and octane (210~300 μ) | ↓ | ↓ | 350 | no | 31,100 | 127.5 | 86.0 | 14,400/ 2.32 | 560/ 0.2 |
| Example-A11 |  |  |  |  | yes | 45,500 | 127.0 | 86.0 | 14,300/ 2.35 | 590/ 0.3 |
| Compara-tive Example-A2 | Polypropylene not having undergone the solvent extraction (210~300 μ) | ↓ | ↓ | 880 | no | 1,500 | — | — | — | — |
| Compara-tive Example-A3 |  |  |  |  | yes | 2,300 | — | — | — | — |
| Compara-tive Example-A4 | SiO₂ (#952) manufactured by Fuji-Davison Chemical, Ltd. | ↓ | ↓ | 330 | no | 8,900 | 126.5 | 87 | 14,300/ 2.68 | 210/ 32.5 |
| Compara-tive Example-A5 |  |  |  |  | yes | 21,000 | 127.0 | 88 | 14,700/ 2.45 | 250/ 42.4 |
| Compara-tive Example-A6 |  |  |  |  | no* | 1,500 | — | — | — | — |

*After one-month preservation

TABLE 3

| | Component (i) | Component (ii) | Component (iii) | Yield at Prepolymer-ization (for Zr) | Activity (g/g Zr) | Melting Point (°C.) | [mm] | Mn/Q | Average particle diameter |
|---|---|---|---|---|---|---|---|---|---|
| Example-A12 | Polypropylene manufactured by Akzo N.V. (210~300 μ) | MMAO manufactured by Tosoh-Akzo Co., Ltd. | Isopropylidene-(cyclopentadienyl)-(fluorenyl)-zirconium dichloride | 650 g/g Zr | 34,500 | 130.2 | [rr] 0.84 | 26,500/ 3.1 | 1,500 |
| Example-A13 | ↓ | ↓ | Dimethylsilylene-bis(2-methylindenyl)-zirconium dichloride | 430 | 15,200 | 135.4 | [mm] 0.89 | 116,000/ 2.42 | 1,500 |
| Example-A14 | ↓ | ↓ | Ethylenebis-(indenyl)zirconium dichloride | 550 | 28,800 | 125.4 | [mm] 0.82 | 13,500/ 2.45 | 1,500 |

Example-B1

Preparation of Component (iii)

Dimethylsilylenebis(2-methylindenyl)zirconium dichloride was prepared in the same manner as in the preparation of the component (iii) in Example-A13.

Preparation of Component (ii)

To a 1000 ml flask thoroughly purged with nitrogen, equipped with a stirrer and a reflux condenser, 100 ml of toluene which had been dehydrated and deoxygenated was introduced. Subsequently, 0.72 g (10 mmol) of trimethylaluminium and 1.96 g (10 mmol) of triisobutylaluminium were diluted in 50 ml of toluene in one of two dropping funnels, and toluene containing saturated water was introduced to the other funnel. The mixed aluminium solution and the toluene containing saturated water were fed to the flask at 30° C. over 3 hours in such a manner that an equimolar amount of the Al and the H₂O were fed at the same time. After the feeding was completed, the mixture was heated to 50° C., and a reaction was carried out for 2 hours. After the reaction was completed, the solvent was distilled off under reduced pressure, thereby giving 1.9 g of methylisobutylalumoxane as a white solid. The white solid thus obtained was dissolved in toluene, and the solution was subjected to a measurement by $^{27}$Al-NMR. As a result, a spectrum having a chemical shift at 174 ppm with a half band width of 5844 Hz was obtained.

Preparation of Solid Catalyst

Porous polypropylene powder (Trademark "Accurel", 200–400 μm classified product) manufactured by Akzo N. V. was used as Component (i). This powder had a pore volume of pores having a diameter between 0.05 to 2.0 μm of 1.89 cc/g, and a total pore volume of pores having a diameter between 0.006 to 10 μm of 2.54 cc/g.

To a 300 ml flask thoroughly purged with nitrogen, 3 g of the above-described porous polypropylene manufactured by Akzo N.V., the component (i), and 2.0 g (0,025 mol) of the above-synthesized methylisobutylalumoxane, Component (ii), in 40 ml of toluene was introduced. Subsequently, 95.2 mg of the above-synthesized dimethylsilylenebis(2-methylindenyl)zirconium dichloride was introduced as Component (iii). While stirring the mixture, the toluene was distilled off at room temperature under a stream of nitrogen over 1 hour, thereby giving a desired solid catalyst. A small amount of the solid catalyst was taken as a sample, and dried at 50° C. under reduced pressure. As a result, the weight loss of the sample was found to be 7%, and the toluene was collected in a cooled trap.

Polymerization of Propylene

To an autoclave equipped with a stirrer and having an internal volume of 1.5 liter was introduced 80 g of table salt which had been thoroughly dehydrated and purged with nitrogen. The inside of the autoclave was then heated to 50° C., and replaced by propylene. Subsequently, 0.5 g of the above-obtained solid catalyst was introduced, and gas phase polymerization was conducted under a propylene pressure of 7 kg/cm$^2$G at a temperature of 50° C. for 2 hours. After the polymerization was completed, the solid produced was collected, and the table salt was washed away from the solid with a large amount of water. The resultant was dried, thereby obtaining 17.5 g of a polymer. The yield was therefore 10.3 kg per 1 g of Zr. The melting point of the polymer was 140.7° C. The [mm] triad fraction rate of the polymer, determined by a measurement using 13C-NMR, was 0.88. The number-average molecular weight determined by GPC was 112,000, the Q value (Mw/Mn) was 2.35 and the average particle diameter was 1.6 mm. The proportion of fine particles having a diameter of 149 μm or less was 0.5% by weight.

Example-B2

Polymerization was conducted under the same conditions as in Example-B1 except that the time for polymerization of propylene was changed to 6 hours. The results are shown in Table 4.

Example-B3

After the solid catalyst obtained in Example-B1 was preserved under a nitrogen atmosphere for 1 month, polymerization was conducted under the same conditions as in Example-B1. The results are shown in Table 4.

Examples-B4 to B6

Polymerization was conducted under the same conditions as in Example-B1 except that a predetermined amount of polymethylalumoxane (with 16 monomers associated) manufactured by Tosoh-Akzo Co., Ltd., polyisobutylalumoxane manufactured by Tosoh-Akzo Co., Ltd. or triisobutylaluminium was used as an optional component B together with 0.6 g of the solid catalyst at the time of polymerization of propylene. The results are shown in Table 4.

Example-B7

Preparation of Solid Catalyst 4 g of porous polypropylene powder (Trademark "Accurel", <100 μm classified product) manufactured by Akzo N. V. was used as Component (i). The powder had a pore volume of pores having a diameter between 0.05 and 2.0 μm of 1.66 cc/g, and a total pore volume of pores having a diameter between 0.006 and 10 μm of 2.33 cc/g.

2.5 g of methylisobutylalumoxane, the "MMAO" (Trademark) (Modified Methylaluminoxane) manufactured by Tosoh-Akzo Co., Ltd., Component (ii), and 86.6 mg of the dimethylsilylenebis(2-methylindenyl)zirconium dichloride synthesized in Example-B1 were diluted in 60 ml of toluene, and the mixture was added dropwise to Component (i) over 30 minutes. After the addition was completed, the toluene was removed by a stream of nitrogen at room temperature, thereby giving a desired solid catalyst. It is noted that a broad spectrum having a chemical shift at 190 ppm with a half band width of 6550 Hz was obtained when the above-described "MMAO"manufactured by Tosoh-Akzo Co., Ltd. was subjected to a measurement using $^{27}$Al-NMR. The toluene content of the solid catalyst obtained was 9% by weight.

Polymerization of Propylene

Polymerization was conducted under the same conditions as in Example-B1 except that 0.5 g of the above-obtained solid catalyst and 0.12 g of the same "MMAO" manufactured by Tosoh-Akzo Co., Ltd. as was used in the preparation of the above solid catalyst were used. The results are shown in Table 8.

Example-B8

Polymerization of Propylene

Polymerization was conducted under the same conditions as in Example-B1 except that 0.8 g of the solid catalyst obtained in Example-B7 was used. The results are shown in Table 5.

Examples-B9 and B10

Preparation of Component (i)

To a 2000 ml glass flask, 20 g of polypropylene powder (upon measurement by a porosimeter, the powder was found to have a pore volume of pores having a diameter of 0.006 to 10 μm of 0.016 cc/g, an average pore diameter of 160 angstrom, and an average particle diameter of 210 to 300 μm) was introduced, followed by 320 ml of n-heptane, 1280 ml of n-octane and 1 g of boiling stone. While stirring, the mixture was heated to the boiling point of the above solvent mixture. After the temperature reached to the boiling point, the solvent mixture was removed in 15 minutes. The resulting polypropylene powder was dried by blowing of nitrogen.

By this extracting process, porous polypropylene powder which is fit for the object of the present invention was obtained. By a measurement using a porosimeter, the powder thus obtained was found to have a pore volume of pores having a diameter between 0.05 and 2 μm of 0.981 cc/g, a pore volume of pores having a diameter between 0.006 and 10 μm of 1.14 cc/g, and an average particle diameter of 210 to 300 μm.

Preparation of Solid Catalyst

A solid catalyst was prepared under the same conditions as in Example-B7 except that 4 g of the above-obtained component (i), 2.5 g of the "MMAO" manufactured by Tosoh-Akzo Co., Ltd., and, as Component (iii), 71.5 mg of the dimethylsilylenebis(2-methylindenyl)zirconium dichloride were used.

Polymerization of Propylene

Polymerization was conducted under the same conditions as in Example-B7 or B8 except that the above-obtained solid catalyst was used. The results are shown in Table 5.

Comparative Examples-B1 and B2

Polymerization was conducted under the same conditions as in Example-B9 or B10 except that the polypropylene powder before being subjected to the extraction by a solvent mixture of n-heptane and n-octane was used as Component (i). The results are shown in Table 5.

Comparative Examples-B3 and B4

Preparation of a solid catalyst and polymerization were conducted under the same conditions as in Comparative Example-B1 or B2 except that 4 g of silica (#952) manufactured by Fuji-Davison Chemical, Ltd. was used as Component (i). The results are shown in Table 5.

Comparative Example-B5

After the solid catalyst prepared in Comparative Example-B3 was preserved under a nitrogen atmosphere for 1 month, polymerization was conducted under the same conditions as in Example-B4. The results are shown in Table 5.

Example-B11

Preparation of Component (iii)

Isopropylidene(cyclopentadienyl)(fluorenyl)zirconium dichloride was synthesized in the same manner as in the preparation of Component (iii) in Example-A12.

Preparation of Solid Catalyst

A solid catalyst was prepared under the same conditions as in Example-B7 except that 62.2 mg of the above-obtained component (iii) was used.

Polymerization of Propylene

Polymerization was conducted under the same conditions as in Example-B8 except that 0.6 g of the above-obtained solid catalyst was used. The catalytic activity was 38,500 g per 1 g of Zr. The polymer obtained was found to have a melting point of 131.5° C., an [rr] triad fraction rate of 0.84, a number-average molecular weight of 29,100, a Q value of 2.52, and an average particle diameter of 210 μm. The proportion of particles having a diameter of 105 μm or less was 4.5% by weight.

Example-B12

Preparation of Component (iii)

Dimethylsilylbis(tetrahydroindenyl)zirconium dichloride was synthesized in accordance with J. Orgmet. Chem., (342) 21–29, 1988 and J. Orgmet. Chem., (369) 359–370, 1989, in the same manner as in the preparation of the Component (iii) in Example-A1.

Synthesis of Solid Catalyst

A solid catalyst was prepared under the same conditions as in Example-B7 except that 68.5 mg of the above-obtained Component (iii) was used.

Polymerization of Propylene

Polymerization was conducted under the same conditions as in Example-B8 except that 0.6 g of the above-obtained solid catalyst was used. The catalytic activity was 58,800 g per 1 g of Zr. The polymer obtained was found to have a melting point of 125.3° C., an [rr] triad fraction of 0.85, a number-average molecular weight of 14,500, a Q value of 2.33, and an average particle diameter of 255 μm. The proportion of the particles having a diameter of 105 μm or less was 20.6% by weight.

TABLE 4

| | Component (B) | Conditions for Polymerization | Remarks | Catalytic activity (g/g Zr) | Melting Point (°C.) | [mm] fraction | Mn/Q Value | Average particle diameter (μ) | Proportion of <300 μ | Remarks |
|---|---|---|---|---|---|---|---|---|---|---|
| Example-B1 | None | 7k 50° C. 2H | | 10,300 | 140.7 | 0.88 | 112,000/2.35 | 1300 | 0.1 | |
| Example-B2 | None | 7k 50° C. 6H | | 31,500 | 140.2 | 0.87 | 108,000/2.55 | 1600 | 0.1 | |
| Example-B3 | None | 7k 50° C. 2H | Solid catalyst after one-month preservation | 11,500 | 138.8 | 0.86 | 109,000/2.46 | 1300 | 0.5 | |
| Example-B4 | Methylalumoxane manufactured by Tosoh-Akzo Co., Ltd.: 0.11 g | ↓ | | 25,500 | 141.5 | 0.88 | 114,000/2.40 | 1600 | 1.5 | |
| Example-B5 | Polyisobutyl-alumoxane manufactured by Tosoh-Akzo Co., Ltd.: 0.15 g | ↓ | | 15,100 | 140.6 | 0.88 | 110,000/2.41 | 1500 | 1.0 | |
| Example-B6 | Triisobutylalum inium: 0.10 g | ↓ | | 19,800 | 141.5 | 0.88 | 104,000/2.56 | 1500 | 1.5 | |

TABLE 5

| | Component (i) | Component (ii) | Component (B) | Remarks | Catalytic activity (g/g Zr) | Melting point (°C.) | [mm] fraction | Mn/Q value | Average particle diameter ($\mu$) | Proportion of <105 $\mu$ |
|---|---|---|---|---|---|---|---|---|---|---|
| Example-B7 | Polypropylene (Trademark "Accurel") manufactured by Akzo N.V. <100 $\mu$ | Tosoh-Akzo Co., Ltd. MMAO | MMAO 0.15 g | | 33,400 | 142.0 | 0.89 | 121,000/ 2.25 | 250 | 3.5 |
| Example-B8 | | | None | | 14,500 | 141.5 | 0.89 | 115,000/ 2.35 | 220 | 1.5 |
| Example-B9 | Polypropylene having undergone extraction with a mixture of n-octane and n-heptane (210~300 $\mu$) | ↓ | MMAO 0.15 g | | 27,700 | 140.5 | 0.88 | 113,000/ 2.42 | 560 | 5.3 |
| Example-B10 | | | None | | 11,800 | 140.5 | 0.88 | 123,000/ 2.38 | 530 | 3.5 |
| Comparative Example-B1 | Polypropylene not having undergone the solvent extraction | Tosoh-Akzo Co., Ltd. MMAO | MMAO 0.15 g | | 5,100 | 140.5 | 0.88 | 110,500/ 2.89 | Whole quantity of the product adhered to the inside of a vessel | |
| Comparative Example-B2 | | | None | | 1,100 | — | — | — | — | |
| Comparative Example B3 | Silica (#952) manufactured by Fuji-Davison Chemical, Ltd. | ↓ | MMAO 0.15 g | | 22,000 | 140.7 | 0.88 | 112,000/ 2.51 | Unmeasurable because of the presence of a large amount of solid matter | 23.8 |
| Comparative Example-B4 | | | None | | 8,200 | 140.2 | 0.88 | 121,000/ 2.67 | Unmeasurable because of the presence of a large amount of solid matter | 36.6 |
| Comparative Example-B5 | | | None | After one-month preservation | tr | — | — | — | — | — |

Example-C1

Components (ii) and (iii), and a solid catalyst were prepared in the same manner as in Example-B1, thereby obtaining a solid catalyst in which the components (ii) and (iii) were supported on the organic porous polymer.

Preparation of Propylene Block Copolymer

To an autoclave equipped with a stirrer and having an internal volume of 1.5 liter, 80 g of table salt which had been thoroughly dehydrated and purged by nitrogen was introduced. The inside of the autoclave was then heated to 50° C., and replaced by propylene. Subsequently, 0.5 g of the above-obtained solid catalyst was introduced to the autoclave, and a first step polymerization in a gas phase was conducted under a propylene pressure of 7 kg/cm$^2$G at a temperature of 50° C. for 4 hours. After the 1st step polymerization was completed, the propylene was purged, and the autoclave was pressurized to 7 kg/cm$^2$G by gas of a 1:3 (molar ratio) mixture of propylene and ethylene, and the polymerization was continued for a further 1 hour. After the polymerization was completed, the solid produced was collected, and the adhering table salt was washed away from the solid with a large amount of water. The resultant was then dried, thereby giving 42.7 g of a polymer. The catalytic activity was therefore 25.1 kg per 1 g of Zr. The melting point of the polymer was 140.5° C., and its curve had only one peak. When the polymer was subjected to extraction with cold xylene, 18% by weight of the whole polymer was dissolved. The portion insoluble in the cold xylene had a number-average molecular weight of 110,000, a Q value of 2.30, and an [mm] triad fraction rate determined by $^{13}$C-NMR of 0.88. The portion soluble in the cold xylene was a rubbery polymer having a number-average molecular weight of 156,000, a Q value of 2.75, $r_{E}r_{p}$ of 0.68, and an ethylene content of 72 mol %. The polymer had an average particle diameter of 2.0 mm. The proportion of fine particles having a diameter of 149 $\mu$m or less was 0.3% by weight or less. The MFR of the whole polymer was 4.6.

Example-C2

Polymerization was conducted under the same conditions as in Example-C1 except that 30 cc of hydrogen was introduced to the system at the time of the 1st step polymerization. The results are shown in Table 6.

Example-C3

Polymerization was conducted under the same conditions as in Example-C1 except that the autoclave was pressurized to 7 kg/cm$^2$G by gas of a 1:1 (molar ratio) mixture of propylene and ethylene at the time of the second step polymerization. The results are shown in Table 6.

Comparative Example-C1

Polymerization was conducted under the same conditions as in Example-C1 except that 9 mmol (calculated on the basis of an Al atom) of Component (ii) was used instead of the solid catalyst obtained in Example-C1, and that 3 μmol of the dimethylsilylenebis(2-methylindenyl)zirconium dichloride, Component (iii), was used. The results are shown in Table 6.

Example-C4

Polymerization was conducted under the same conditions as in Example-C1 except that 1 mmol of triisobutylaluminium was introduced to the system as a third component at the time of the first step polymerization. The results are shown in Table 6.

Example-C5

Polymerization was conducted under the same conditions as in Example-C4 except that the second step polymerization was conducted for two hours. The results are shown in Table 6.

Example-C6

Dimethylsilylenebis(tetrahydroindenyl)zirconium dichloride was synthesized in the same manner as in the preparation of the catalytic component (iii) in Example-A1.

Preparation of Solid Catalyst

Porous polypropylene powder (Trademark "Accurel", <100 μm classified product) manufactured by Akzo N. V. was used as Component (i). This powder had a pore volume of pores having a diameter between 0.5 to 2.0 82 m of 1.66 cc/g, and a total pore volume of pores having a diameter between 0.006 to 10 μm of 2.33 cc/g.

To a 300 ml flask thoroughly purged with nitrogen, 3 g of the above-described porous polypropylene manufactured by Akzo N. V., Component (i), and a solution in 40 ml toluene of approximately 1.8 g (0.0228 mol) of the methylisobutylalumoxane synthesized in Example-C1, Component (ii) were introduced. Subsequently, 42 mg of the above-synthesized dimethylsilylenebis(tetrahydroindenyl)zirconium dichloride was introduced as the component (iii). While stirring the mixture, the toluene was removed at room temperature under a stream of nitrogen over 1 hour so that polypropylene particles would be able to flow independently. A portion of this was taken as a sample, and dried at 50° C. under reduced pressure. As a result, the weight loss of the sample was found to be 11%, and the toluene was collected in a cooled trap.

The above-obtained impregnated solid was subjected to preliminary polymerization where propylene is polymerized which flew thereover under atmospheric pressure. The preliminary polymerization was conducted at a temperature between 10° C. and 20° C. for 30 minutes by controlling the flow of propylene gas while cooling the system with ice water. The polymerization temperature was controlled by cooling the system with ice water and also by changing the mixing ratio of flowing gas, viz a mixture of propylene and nitrogen. After the preliminary polymerization was completed, the solid produced was collected. As a result, 9.5 g of the solid was obtained. The Zr content of this solid was 0.76 mg/g. The polymer yield at the preliminary polymerization was 650 g per 1 g of Zr.

Preparation of Propylene Block Copolymer

To an autoclave equipped with a stirrer and having an internal volume of 1.5 liter, 80 g of table salt which had been thoroughly dehydrated and purged with nitrogen was introduced. The inside of the autoclave was then heated to 30° C., and replaced by propylene. Subsequently, 0.6 g of the above-obtained solid catalyst was introduced to the autoclave, and a first step polymerization in gas phase was conducted under a propylene pressure of 7 kg/cm$^2$G at a temperature of 30° C. for 6 hours. After the first polymerization was completed, the propylene was purged, and the autoclave was pressurized to 7 kg/cm$^2$G by gas of a 1:3 (molar ratio) mixture of propylene and ethylene, and a second step polymerization was conducted at 30° C. for 1 hour. The polymer obtained was then treated in the same manner as in Example-C4. The results are shown in Table 6.

Example-C7

Preparation of Component (iii)

Isopropylidene(cyclopentadienyl)(fluorenyl)zirconium dichloride was synthesized in the same manner as in the preparation of Component (iii) in Example-A12.

Preparation of Solid Catalyst

A solid catalyst was prepared in the manner as in Example-C1 except that 65.5 mg of the above-obtained Component (iii) was used. The Zr content of the catalyst was 0.88 mg/g, and the polymer yield at the preliminary polymerization was 650 g per 1 g of Zr.

Preparation of Propylene Block Copolymer

Polymerization was conducted in the same manner as in Example-C4 except that 1.0 g of the above-obtained solid catalyst was used. The results are shown in Table 6.

Referential Example

The polymer obtained in any of the above Examples-C1 to C7 and Comparative Example-C1 was melted in a plastomill, and then subjected to press molding to give a sheet having a thickness of 2 mm. The mechanical properties of the sheet was measured, and the results as shown in Table 7 were obtained.

TABLE 6

| | Solid Catalyst | | Catalytic activity (kg polymer/g Zr) | Total polymer MFR (g/10 min) | Average particle diameter (mm) | Proportion of fine particles of 149 μ or less (wt %) | Bulk density (g/cc) | Portion insoluble in cold xylene | | | Melting point (°C.) |
|---|---|---|---|---|---|---|---|---|---|---|---|
| | Component (iii) | Zr content (mg/g) | | | | | | Mn | Q | Tacticity [mm] | |
| Example-C1 | Dimethyl-silylenebis(2-methylindenyl)-zirconium | 3.40 | 25.1 | 4.6 | 2.0 | 0.3 | 0.39 | 111,000 | 2.30 | 0.88 | 140.5 |

TABLE 6-continued

| | Solid Catalyst | | Catalytic activity | Total polymer | | Proportion of fine particles | | Portion insoluble in cold xylene | | | Melting |
|---|---|---|---|---|---|---|---|---|---|---|---|
| | Component (iii) | Zr content (mg/g) | (kg polymer/-g Zr) | MFR (g/-10 min) | Average particle diameter (mm) | of 149 μ or less (wt %) | Bulk density (g/cc) | Mn | Q | Tacticity [mm] | point (°C.) |
| Example-C2 | dichloride ↓ | ↓ | 31.2 | 12.5 | 2.1 | 0.5 | 0.40 | 75,000 | 2.12 | 0.89 | 142.0 |
| Example-C3 | ↓ | ↓ | 24.8 | 5.7 | 2.0 | 0.3 | 0.38 | 115,000 | 2.25 | 0.88 | 140.0 |
| Comparative Example-C1 | ↓ | — | 12.7 | 5.0 | Sticky, poor in particle properties, unmeasurable | | | 112,200 | 2.21 | 0.88 | 138.5 |
| Example-C4 | ↓ | 3.40 | 70.4 | 5.5 | 2.2 | 0.3 | 0.41 | 105,000 | 2.25 | 0.89 | 139.5 |
| Example-C5 | ↓ | ↓ | 80.1 | 4.4 | 2.2 | 0.3 | 0.42 | 107,000 | 2.25 | 0.89 | 139.0 |
| Example-C6 | Dimethyl-silylenebis-(tetrahydro-indenyl)-zirconium dichloride | 0.76 | 95.5 | 55.8 | 0.52 | 0.5 | 0.42 | 41,100 | 2.18 | 0.940 | 144.5 |
| Example-C7 | Isopropylidene-(cyclopenta-dienyl)-(fluorenyl)-zirconium dichloride | 0.88 | 45.7 | 15.8 | 2.1 | 0.3 | 0.40 | 29,900 | 3.0 | [rr] 0.85 | 132.7 |

TABLE 7

| | Portion Soluble in Cold Xylene (wt%) | Portion Soluble in Cold Xylene | | | | Remarks | Izod Impact Strength (kg-cm/cm$^2$) | Olsen flexural modulus (Kg/cm$^2$) |
|---|---|---|---|---|---|---|---|---|
| | | Mn | Ethylene content (wt %) | Q | $r_P r_E$ | | | |
| Example-C1 | 18 | 156,000 | 72 | 2.75 | 0.88 | Not sticky | 5.6 | 10,500 |
| Example-C2 | 15 | 141,000 | 70 | 2.53 | 0.65 | Not sticky | 4.6 | 11,100 |
| Example-C3 | 20 | 121,000 | 59 | 2.26 | 0.63 | Not sticky | 6.7 | 10,300 |
| Comparative Example-C1 | 16 | 138,000 | 72 | 2.89 | 0.69 | Sticky (70% of the product adhered to the inside of a polymerization vessel) | 3.8 | 10,400 |
| Example-C4 | 17 | 147,000 | 70 | 2.61 | 0.70 | Not sticky | 5.5 | 10,500 |
| Example-C5 | 28 | 146,000 | 70 | 2.77 | 0.70 | Not sticky | 7.6 | 9,900 |
| Example-C6 | 20 | 155,000 | 72 | 2.58 | 0.90 | Not sticky | 5.2 | 12,000 |
| Example-C7 | 12 | 105,000 | 68 | 2.88 | 0.52 | Not sticky | 38 | 4,500 |

Example-D1

Preparation of Solid Catalyst

Porous polypropylene powder (Trademark "Accurel", 400–1000 μm classified product) manufactured by Akzo N. V. was used as Component (i). This powder had a pore volume of pores having a diameter between 0.05 to 2.0 μm of 1.40 cc/g, and a total pore volume of all pores having a diameter between 0.006 to 10 μm of 1.90 cc/g.

To a 500 ml flask thoroughly purged with nitrogen, 10 g of the above-described porous polypropylene manufactured by Akzo N. V., Component (i), MMAO (Lot No. 0102) manufactured by Tosoh-Akzo in an amount of 30 mmole in terms of Al, Component (ii), and 6.85 mg (20 micromol) of the dimethylsilylenebis(4,5,6,7-tetrahydroindenyl)zirconium dichloride admixed in 60 ml of toluene were introduced. Thereafter, while stirring the mixture, the toluene was distilled off at room temperature under a stream of nitrogen over 1 hour so that polypropylene particles would be able to flow independently.

The above-obtained impregnated solid was subjected to preliminary polymerization where propylene was prepolymerized which flew thereover under atmospheric pressure. The preliminary polymerization was conducted at a temperature between 10° C. and 20° C. for 1 hour by controlling the flow of propylene gas while cooling the system with ice water. The polymerization temperature was controlled by cooling the system with ice water. After the preliminary polymerization was completed, a solid produced was collected. As a result, 21.5 g of the solid was obtained. The Zr content of this solid was 0.064 mg/g. The polymer yield at the preliminary polymerization was 800 g per 1 g of Zr.

Polymerization of ethylene/propylene

To an autoclave equipped with a stirrer and having an internal volume of 1.5 liter was introduced 80 g of table salt which had been thoroughly dehydrated and purged with nitrogen. The inside of the autoclave was then heated to 50° C., and replaced by a 4/1 (mole) mixture of ethylene/propylene. Subsequently, 8 g of the above-obtained solid catalyst was introduced, and gas phase polymerization was conducted under a constant ethylene/propylene pressure of 5 kg/cm$^2$G for 1 hour. After the polymerization was completed, the solid produced was collected, and the table salt was washed away from the solid with a large amount of water. The resultant was dried, thereby giving 42.5 g of a particulate elastomer. The bulk density of the elastomer was 0.36 and the average particle diameter was approximately 1500 μm.

The polymer obtained was subjected to Soxhlet extraction with hexane, and 1.25 g of the polymer corresponding to 62.5% by weight of the total polymer was obtained as an extracted polymer.

The polymer soluble in hexane was found, upon 13C-NMR analysis, to have an ethylene content of 64.5% by weight, the copolymerization ratio ($r_p \cdot r_E$) of 1.03, Mn upon GPC analysis of 23,600 and Mw/Mn of 2.90.

Example-D2

The procedure set forth in Example-D1 was followed except for the use of the MMAO (Tosoh-Akzo) in an amount of 0.12 g at the polymerization.

The result obtained is set forth in Table 5.

Example-D3

Preparation of Component (iii)

Dimethylsilylenebis(2-methyl-4,5,6,7-tetrahydroindenyl)zirconium dichloride was prepared by first synthesizing dimethylsilylenebis(2-methylindenyl)zirconium dichloride as in Example-A13, and the latter in an amount of 1.0 g was dissolved in 150 ml of dichloromethane and was introduced in an autoclave of 500 ml capacity in which it was reacted in the presence of 0.1 g of platinum oxide added with hydrogen under a pressure of 50 kg/cm²G at room temperature for 5 hours. The platinum oxide catalyst was then removed and the solvent used was removed in vacuo whereby a solid was obtained, which solid was extracted with toluene and recrystallization was conducted to give 0.32 g of dimethylsilylenebis(2-methyl-4,5,6,7-tetrahydroindenyl)zirconium dichloride desired.

Preparation of Solid Catalyst

The procedure for preparing a solid catalyst set forth in Example-D1 was followed except for the use of 20 g of porous polypropylene powder manufactured by Tosoh-Akzo used in Example-D1, 41 mmole of MMAO manufactured by Tosoh-Akzo, and dimethylsilylenebis(2-methyl-4,5,6,7-tetrahydroindenyl)zirconium dichloride prepared hereinabove in 8 mg (16.5 micromol) to prepare a solid catalyst in an amount of 68.1 g. The Zr content was 0.022 mg/g.solid and the polymer yield at the preliminary polymerization was ca. 30,000 g/g.Zr.

Polymerization of ethylene/propylene

The procedure of producing an elastomer/ethylene-propylene copolymer set forth in Example-D1 was followed except for the use of 8 g of the solid catalyst prepared hereinabove.

The results obtained are set forth in Table 8.

Examples-D4 and D5

The procedure for polymerization set forth in Example-D3 except for the use of 8 g of the solid catalyst prepared in Example-D3 and 0 o 12 g of MMAO manufactured by Tosoh-Akzo or 0.14 g of triisobutylaluminum.

The results obtained are set forth in Table 8.

Example-D6

Preparation of Component (ii)

To a flask of 500 ml-capacity purged with nitrogen was introduced n-butylboric acid (Aldrich) in an amount of 2 g (19.6 mmol) and 60 ml of toluene deoxygenated and dehydrated, which were then cooled to −50° C. A solution in 80 ml of toluene of 1.12 g (9.85 mmol) of triethylaluminum and 5.85 g (29.6 mmol) of triisobutylaluminum was introduced into the flask for over 1 hour, followed by warming to room temperature for over 2 hours. When the temperature was raised to approximately −20° C., a remarkable amount of gas evolved. After the temperature reached room temperature, the mixture was agitated for 1 hour, whereby a solution of a reaction product of butylboric acid, TEA and TIBA was obtained. The solution was found to contain 0.28 mmol/ml of aluminum.

Preparation of Solid Catalyst

A mixture of 10 g of porous polypropylene powder used in Example-D1 as Component (i), Component (ii) prepared hereinabove in an amount of 20 mmol in terms of an aluminum atom, dimethylsilylenebis(4,5,6,7-tetrahydroindenyl)zirconium dichloride in an amount of 9.1 mg (20 micromol), Component (iii), and 80 ml of toluene dehydrated and deoxygenated was prepared, which was then subjected to evaporation of the solvent at room temperature under agitation under nitrogen for over 1.5 hours so that the mass of polypropylene particles can flow.

The mass was then subjected to preliminary polymerization where ethylene was polymerized which flew thereover under atmospheric pressure at a temperature maintained at 10° to 20° C. by cooling by ice-water for 1 hour.

After the preliminary polymerization, the solid product was recovered in an amount of 18.7 g, which was found to contain 0.107 mg/g-solid of Zr.

The polymer yield was thus 2,800 g polyethylene/g-zirconium.

Polymerization of ethylene/propylene

The procedure for copolymerization of ethylene with propylene/production of an elastomer set forth in Example-D1 was followed except for the use of 8 g of the solid catalyst prepared hereinabove, 0.14 g of triisobutylaluminum and a polymerization temperature of 70° C. used.

The results obtained are set forth in Table 8.

Examples-D7 to D10

The procedure set forth in Example-D5 was followed except for a polymerization temperature, a polymerization time and monomer feed ratio changed to those set forth in Table 9.

The results obtained are set forth in Table 9.

TABLE 8

| Example | Optional component B | Yield (g) | Yield g · polymer/ g · Comp. (iii) | Bulk density (g/cc) | MFR 230° C. (g/10 min) | Hexane solubles (HS) (wt %) | C₂-content in HS (wt %) | $r_E r_p$ | Mn/Q |
|---|---|---|---|---|---|---|---|---|---|
| -D1 | none | 28.2 | 11,100 | 0.36 | * | 62.5 | 64.5 | 1.03 | 23,600/2.90 |
| -D2 | MMAO 0.12 g | 42.5 | 16,700 | 0.37 | * | 73.3 | 62.6 | 0.93 | 22,100/2.92 |
| -D3 | none | 22.6 | 24,100 | 0.41 | 0.15 | 55.6 | 63.5 | 0.95 | 102,000/2.90 |
| -D4 | MMAO | 35.6 | 38,000 | 0.44 | 0.23 | 69.5 | 61.8 | 0.87 | 96,100/2.93 |

TABLE 8-continued

| Example | Optional component B | Yield (g) | Yield g · polymer/ g · Comp. (iii) | Bulk density (g/cc) | MFR 230° C. (g/10 min) | Hexane solubles (HS) (wt %) | C₂-content in HS (wt %) | $r_{ET_p}$ | Mn/Q |
| --- | --- | --- | --- | --- | --- | --- | --- | --- | --- |
| -D5 | 0.12 g TIBA | 40.7 | 43,400 | 0.43 | 0.11 | 71.1 | 66.0 | 1.01 | 105,000/2.88 |
| -D6 | 0.14 g ↓ | 17.2 | 4,000 | 0.38 | 13.3 | 48.7 | 75.5 | 1.15 | 45,800/3.22 |

*excessively flowing

TABLE 9

| Example | C₂/C₃ mole ratio | Polymerization Time (Hr) | Polymerization temp. (°C.) | Yield (g) | Yield g · polymer/- g · Comp. (ii) | Bulk density (g/cc) | MFR 230° C. (g/10 min) | Hexane solubles (HS) Amount (wt %) | Hexane solubles (HS) C₂ content (wt %) | $r_{ET_p}$ | Mn/Q |
| --- | --- | --- | --- | --- | --- | --- | --- | --- | --- | --- | --- |
| -D7  | 3/1 | 1   | 50° C. | 34.4 | 32,300 | 0.27 | 0.815 | 75.8 | 56.4 | 0.93 | 72,800/3.24 |
| -D8  | 2/1 | 1   | 40° C. | 29.8 | 28,800 | 0.28 | 0.411 | 63.3 | 51.5 | 0.78 | 88,500/3.18 |
| -D9  | 3/1 | 1   | 40° C. | 36.5 | 34,300 | 0.32 | 0.27  | 71.6 | 55.0 | 0.81 | 113,000/2.91 |
| -D10 | 3/1 | 0.5 | 40° C. | 17.8 | 16,700 | 0.33 | 0.47  | 49.2 | 55.1 | 0.83 | 101,000/3.07 |
| -D11 | 3/1 | 2.0 | 40° C. | 63.6 | 59,800 | 0.27 | 0.86  | 82.7 | 54.5 | 0.82 | 98,300/2.68 |
| -D12 | 3/1 | 1   | 30° C. | 37.3 | 35,100 | 0.33 | 0.20  | 67.8 | 52.6 | 0.79 | 92,100/3.53 |

What is claimed is:

1. In a process for preparing α-olefin polymers in which an α-olefin is contacted with a catalyst to polymerize, the improvement which comprise the use as the catalyst of a solid product comprising Components (ii) and (iii) supported on Component (i):

Component (i) being an organic porous polymer having an average particle diameter of 5 to 1,000 μm, in which the total pore volume of all pores whose diameter is 0.006 to 10 μm is no smaller than 0.3 cc/g, and the total pore volume of all pores whose diameter is 0.05 to 2 μm is no smaller than 50% of the total pore volume of all pores whose diameter is 0.006 to 10 μm;

Component (ii) being a compound having the structure

in which R is a hydrocarbyl group having 1 to 10 carbon atoms; and

Component (iii) being a compound of a transition metal of the Groups IVB to VIB in the Periodic Table, having at least one conjugated 5-membered cyclic ligand.

2. A method for preparing an α-olefin polymer as set forth in claim 1, wherein the organic porous polymer, Component (i), is one having an average particle diameter of 10 to 700 μm.

3. A method for preparing an α-olefin polymer as set forth in claim 1, wherein the organic porous polymer, the component (i), is one having an average particle diameter of 20 to 500 μm.

4. A method for preparing an α-olefin polymer as set forth in claim 1, wherein the organic porous polymer, Component (i), is one having a total pore volume of all pores whose diameter is 0.006 to 10 μm of no smaller than 0.8 cc/g.

5. A method for preparing an α-olefin polymer as set forth in claim 1, wherein the organic porous polymer, Component (i), is one having a total pore volume of all pores whose diameter is 0.006 to 10 μm of no smaller than 1.0 cc/g.

6. A method for preparing an α-olefin polymer as set forth in claim 1, wherein the organic porous polymer, Component (i), is one in which a total pore volume of all pores whose diameter is 0.005 to 2 μm is no smaller than 60% of a total pore volume of all pores whose diameter is 0.006 to 10 μm.

7. A method for preparing an α-olefin polymer as set forth in claim 1, wherein the organic porous polymer, Component (i), is selected from the group consisting of polymers of an α-olefin having 2 to 10 carbon atoms, polymers of styrene or its derivative having a hydrocarbyl group at its nucleus and/or side chain, and polar polymers containing an O, N or halogen atom.

8. A method for preparing an α-olefin polymer as set forth in claim 1, wherein the organic porous polymer, Component (i), is a polymer of an α-olefin having 2 to 10 carbon atoms.

9. A method for preparing an α-olefin polymer as set forth in claim 1, wherein the organic porous polymer, the component (i), is a polymer of an α-olefin which is the same one as to be finally polymerized.

10. A method for preparing an α-olefin polymer as set forth in claim 1, wherein Component (ii) is an alumoxane.

11. A method for preparing an α-olefin polymer as set forth in claim 1, wherein Component (iii) is a transition metal compound represented by the following formula (1) or (2):

wherein Q represents a binding group which crosslinks the two conjugated 5-membered cyclic ligands, S represents a binding group which crosslinks the conjugated 5-membered cyclic ligand and the group Z, a is 0 or 1, b, c and d are an integer which fulfills the conditions of $0 \leq b \leq 5$, $0 \leq c \leq 5$ and $0 \leq d \leq 5$ when a is 0, and $0 \leq b \leq 4$, $0 \leq c \leq 4$ and $0 \leq d \leq 4$ when a is 1, $R^1$, $R^2$ and $R^3$ are each a halogen atom, an alkoxy group having 1 to 12 carbon atoms, a silicon-containing hydrocarbon group having 1 to 24 carbon atoms, containing a silicon atom in the form of —Si(R)(R')(R''), a phosphorus-containing hydrocarbon group having 1 to 18 carbon atoms, containing a phosphorus atom in the form of —P(R)(R'), a nitrogen-containing hydrocarbon group having 1 to 18 carbon atoms, containing a nitrogen atom in the form of —N(R)(R'), or a boron-containing hydrocarbon group having 1 to 18 carbon atoms, containing a boron atom in the form of —B(R)(R'), provided that when b, c or d is 2 or more and a plurality of $R^1$s, $R^2$s or $R^3$s are existing, they may be the same or different, Me is a transition metal of the Group of IVB to VIB in the Periodic Table, Z is oxygen (—O—), sulfur (—S—), an alkoxy group having 1 to 20 carbon atoms, a thioalkoxy group having 1 to 20 carbon atoms, a silicon-containing hydrocarbon group having 1 to 40 carbon atoms, a nitrogen-containing hydrocarbon group having 1 to 40 carbon atoms, or a phosphorus-containing hydrocarbon group having 1 to 40 carbon atoms, provided that one of the bonds in the group Z is bound to the group S, a binding group, when a is 1, and X and Y, which may be the same or different, are each hydrogen, a halogen group, a hydrocarbyl group having 1 to 20 carbon atoms, an alkoxy group having 1 to 20 carbon atoms, an amino group, a phosphorus-containing hydrocarbon group having 1 to 20 carbon atoms, or a silicon-containing hydrocarbon group having 1 to 20 carbon atoms.

12. A method for preparing an α-olefin polymer as set forth in claim 1, wherein Component (iii) is a compound of a metal, Me, selected from the group consisting of titanium, zirconium and hafnium.

13. A method for preparing an α-olefin polymer as set forth in claim 11, wherein Component (iii) is a compound wherein the a is 1 (unity) and Q or S is selected from the group consisting of an alkylene group and an alkylsilylene group.

14. A method for preparing an α-olefin polymer as set forth in claim 1, wherein the catalyst is a solid prepared by making Components (ii) and (iii) be supported in Component (i), and then subjecting the resultant to preliminary polymerization in which it is brought into contact with an olefin under the gas phase condition to give 0.01 to 500 g of a polymer of the olefin per 1 g of the total amount of Components (i), (ii) and (iii).

15. A method for preparing an α-olefin polymer as set forth in claim 14, wherein the amount of the α-olefin polymer obtained by the preliminary polymerization is 0.1 to 100 g per 1 g of the total amount of Components (i), (ii) and (iii).

16. A method for preparing an α-olefin polymer as set forth in claim 14, wherein the amount of the α-olefin polymer obtained by the preliminary polymerization is 0.2 to 30 g per 1 g of the total amount of Components (i), (ii) and (iii).

17. A method for preparing an α-olefin polymer as set forth in claim 14, wherein the α-olefin used for the preliminary polymerization is selected from the group consisting of ethylene, propylene, butene-1, 3-methylbutene-1, and a mixture thereof.

18. A method for preparing an α-olefin polymer as set forth in claim 1, wherein the catalyst is a combination of a solid which is obtained by making Components (ii) and (iii) be supported on Component (i), and an organoaluminium compound.

19. A method for preparing an α-olefin polymer as set forth in claim 14, wherein the catalyst is a combination of a solid which is obtained by making Components (ii) and (iii) be supported on Component (i), and then subjecting the resultant to preliminary polymerization in which it is brought into contact with an olefin under the gas phase condition, and an organoaluminium compound.

20. A method for preparing an α-olefin polymer as set forth in claim 1, wherein the polymerization is characterized in that a first step polymerization is conducted in the presence of the catalyst substantially under a gas phase to give a crystalline propylene homopolymer, or a propylene-ethylene copolymer having the ethylene content of 5% by weight or less, and that a second step polymerization is conducted in the presence of both the catalyst and the polymer obtained by the first step polymerization to polymerize propylene and at least one comonomer selected from the group consisting of ethylene and α-olefins having 4 to 20 carbon atoms in such a polymerization ratio in molar ratio of 0/100 to 80/20, provided that the weight ratio of the polymerization amount at the first step polymerization to the polymerization amount at the second step polymerization is 95/5 to 30/70.

21. A method for preparing an α-olefin copolymer as set forth in claim 1, wherein the polymerization is characterized in that at least two monomers selected from the group consisting of ethylene, propylene and an α-olefin of 4–20 carbon atoms are polymerized so that the two monomers are polymerized in a molar ratio of 10/90 to 90/10.

* * * * *

UNITED STATES PATENT AND TRADEMARK OFFICE
CERTIFICATE OF CORRECTION

PATENT NO. : 5,346,925
DATED : September 13, 1994
INVENTOR(S) : Toshihiko SUGANO et al.

It is certified that error appears in the above-indentified patent and that said Letters Patent is hereby corrected as shown below:

On the Title page, [57], Abstract, $$"-Al-O-"$$ with $R$ above $Al$ should read $$-- Al-O- --$$ with $R$ above $Al$.

Column 3, lines 30-35, "$-Al-O-$" with $R$ above $Al$ should read $$-- Al-O- --$$ with $R$ above $Al$.

UNITED STATES PATENT AND TRADEMARK OFFICE
CERTIFICATE OF CORRECTION

PATENT NO. : 5,346,925

DATED : September 13, 1994

INVENTOR(S) : Toshihiko SUGANO et al.

It is certified that error appears in the above-indentified patent and that said Letters Patent is hereby corrected as shown below:

Column 5, lines 1-4, "$-\underset{\underset{\text{Al}}{|}}{\overset{\text{R}}{}}-\text{O}-$" should read $--\underset{\underset{\text{Al}}{|}}{\overset{\text{R}}{}}-\text{O}- --.$ Column 43, lines 40-45, Claim 1, "$-\underset{\underset{\text{Al}}{|}}{\overset{\text{R}}{}}-\text{O}-$" should read $--\underset{\underset{\text{Al}}{|}}{\overset{\text{R}}{}}-\text{O}- --.$ Signed and Sealed this Fifteenth Day of April, 1997

Attest:

BRUCE LEHMAN

Attesting Officer        Commissioner of Patents and Trademarks